United States Patent
Nakatsu et al.

(10) Patent No.: US 9,926,616 B2
(45) Date of Patent: Mar. 27, 2018

(54) HEATING APPARATUS, HEAT TREATMENT APPARATUS, AND HEATING METHOD

(71) Applicants: NETUREN CO., LTD., Tokyo (JP); NETUREN TAKUTO CO., LTD., Shizuoka (JP)

(72) Inventors: Hitoshi Nakatsu, Tokyo (JP); Hisaaki Watanabe, Shizuoka (JP)

(73) Assignees: NETUREN CO., LTD., Tokyo (JP); NETUREN TAKUTO CO., LTD., Shizuoka (JP)

( * ) Notice: Subject to any disclaimer, the term of this patent is extended or adjusted under 35 U.S.C. 154(b) by 0 days.

(21) Appl. No.: 15/003,375

(22) Filed: Jan. 21, 2016

(65) Prior Publication Data

US 2016/0138121 A1    May 19, 2016

Related U.S. Application Data

(62) Division of application No. 13/420,257, filed on Mar. 14, 2012, now Pat. No. 9,273,373.

(30) Foreign Application Priority Data

Mar. 15, 2011  (JP) .................. 2011-057309
Mar. 15, 2011  (JP) .................. 2011-057310

(51) Int. Cl.
*H05B 6/10*    (2006.01)
*H05B 6/02*    (2006.01)
(Continued)

(52) U.S. Cl.
CPC ............. *C21D 1/42* (2013.01); *C21D 9/0018* (2013.01); *C21D 9/0025* (2013.01); *C21D 9/40* (2013.01);
(Continued)

(58) Field of Classification Search
CPC .......... C21D 1/42; C21D 9/40; C21D 9/0025; C21D 9/0018; C21D 9/677; C21D 9/673;
(Continued)

(56) References Cited

U.S. PATENT DOCUMENTS 3,525,842 A    8/1970  Steinhoff et al.
3,744,403 A *  7/1973  Castronuovo ......... A47J 37/043
                                                       219/389
(Continued)

FOREIGN PATENT DOCUMENTS

JP    05-033060      2/1993
JP    2005-325409    11/2005
(Continued)

OTHER PUBLICATIONS

Translation JP2009287074A, Induction treatment apparatus, induction Treatment method and Rolling Bearing with Annular Component Having Undergone Induction Heat Treatment Method, Dec. 10, 2009.*

(Continued)

*Primary Examiner* — Quang Van
(74) *Attorney, Agent, or Firm* — Wenderoth, Lind & Ponack, L.L.P.

(57) ABSTRACT

A heating apparatus, a heat treatment apparatus, and a heating method are provided. The heating apparatus includes a workpiece support on which a ring-shaped workpiece is placed, a rotary drive assembly, and a heater configured to heat the workpiece. The workpiece support includes a plurality of rotating rollers arranged in a circumferential direction. The rotary drive assembly is configured to rotate the plurality of rotating rollers to rotate the workpiece placed on the workpiece support along a ring shape of the workpiece. The heater includes a heating coil configured to induction-heat the workpiece on the workpiece support at (Continued)

a heating position, and an actuator configured to move the heating coil at the heating position relative to the workpiece to adjust a distance between the workpiece and the heating coil.

2 Claims, 20 Drawing Sheets

(51) Int. Cl.

| | | |
|---|---|---|
| *C21D 9/00* | (2006.01) | |
| *C21D 1/42* | (2006.01) | |
| *C21D 9/40* | (2006.01) | |
| *F27B 9/16* | (2006.01) | |
| *F27B 9/36* | (2006.01) | |
| *F27B 9/24* | (2006.01) | |
| *C21D 9/673* | (2006.01) | |
| *C21D 9/677* | (2006.01) | |
| *C21D 1/10* | (2006.01) | |
| *C21D 1/63* | (2006.01) | |

(52) U.S. Cl.
CPC ............... *F27B 9/16* (2013.01); *F27B 9/24* (2013.01); *F27B 9/36* (2013.01); *H05B 6/102* (2013.01); *C21D 1/10* (2013.01); *C21D 1/63* (2013.01); *C21D 9/673* (2013.01); *C21D 9/677* (2013.01); *Y02P 10/253* (2015.11)

(58) Field of Classification Search
CPC ..... F27B 9/16; F27B 9/36; F27B 9/24; H05B 6/102; Y02P 10/253
USPC ........ 219/600, 632, 650, 662, 676.642, 635, 219/671–673, 620, 639, 633; 426/282; 425/50
See application file for complete search history.

(56) References Cited

U.S. PATENT DOCUMENTS

| 6,673,184 B1* | 1/2004 | Brown ............... B29D 30/0633 152/564 |
| 2002/0015746 A1* | 2/2002 | Mitamura ........... B29C 35/0272 425/50 |

FOREIGN PATENT DOCUMENTS

| JP | 2008-202099 | 9/2008 |
| JP | 2009-287074 | 12/2009 |

OTHER PUBLICATIONS

Watanuki Daisuke et al., Translation of JP2009287074A, Induction Heat Treatment Apparatus, Induction Heat Treatment Method and Rolling Bearing with Annular Component Having Undergone Induction Heat Treatment Method, Sep. 4, 2008, Espacenet.

* cited by examiner

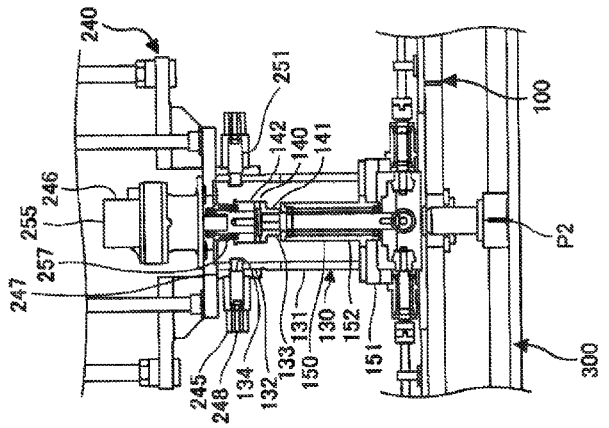
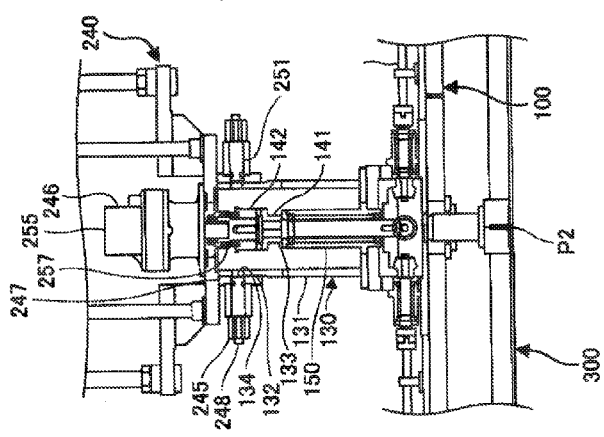
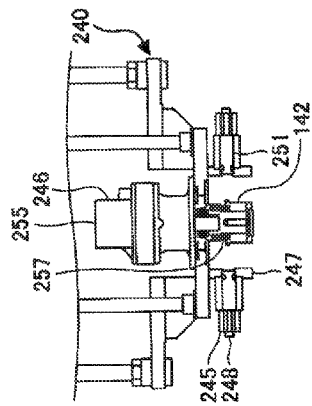

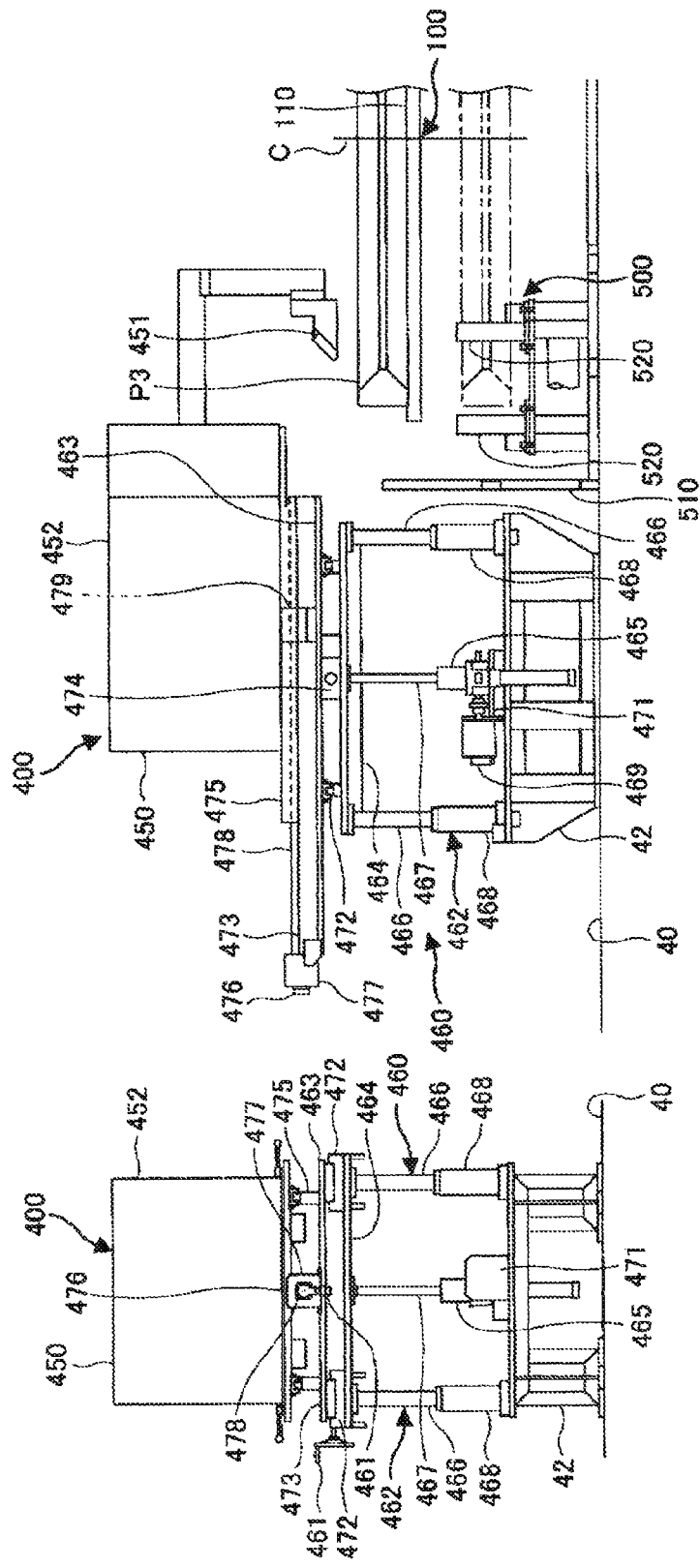

HEATING APPARATUS, HEAT TREATMENT APPARATUS, AND HEATING METHOD

CROSS-REFERENCE TO RELATED APPLICATION

The present application claims priority from Japanese Patent Applications No. 2011-057309 filed on Mar. 15, 2011, and No. 2011-057310 filed on Mar. 15, 2011, the entire contents of which are incorporated herein by reference.

FIELD OF INVENTION

The present invention relates to a heating apparatus, a heat treatment apparatus and a heating method for induction heating a ring-shaped workpiece.

BACKGROUND

Conventionally, to heat a ring-shaped workpiece, the workpiece is supported by a supporting device, e.g., a chuck mechanism, and is heated by a heating coil while being rotated. To heat a large ring-shaped workpiece, there has been proposed a heat treatment apparatus which heats the workpiece without clamping the workpiece with a chuck mechanism.

According to a first related art, a high-frequency heat treatment apparatus is configured to heat a large ring-shaped member, such as a bearing ring. The ring-shaped member is supported on a turntable, and a plurality of horseshoe-shaped heating coils are arranged in a circumferential direction of the ring-shaped member. The ring-shaped member is heated by the heating coils while being rotated together with the turntable. See, e.g., JP 2005-325409 A.

According to a second related art, a heat treatment apparatus is configured to heat the entire annular member by a high-frequency heat treatment. In this heat treatment apparatus, a large annular member is supported on a plurality of support rollers, and a radially outer surface or a radially inner surface of the annular member is pressed by three or more positioning rollers to position the annular member. The annular member is induction-heated by heating coils while being rotated. See, e.g., JP 2009-287074 A In the related art heat treatment apparatuses, however, the workpiece is carried in using a support tool for carrying in, and the workpiece is supported and positioned on a jig such as the turntable or the support roller when heating the workpiece, and thereafter, the workpiece is carried out using a support tool for carrying out. Thus, the workpiece is placed on different jigs or support tools when carrying in, heating and carrying out. In the case of a large workpiece, the gravity center of the workpiece has to be adjusted to stably convey the workpiece when carrying in or out the workpiece, and the workpiece has to be positioned with good accuracy when heating to realize a desired heating. For example, during the heating, a ring-shaped workpiece is rotated about a center axis thereof. Therefore, onerous work is necessary to position the workpiece, and the positioning structure is complex. Further, structures for supporting the workpiece for conveying and heating are respectively provided, so that the configuration is complex.

According to the first related art, the ring-shaped workpiece is supported and rotated on the turntable, and the workpiece needs to have a shape that fits the turntable so that the workpiece can be rotated together with the turntable. Thus, a workpiece that can be heated by the heat treatment apparatus is limited. In other words, the turntable has to be able to turn with the workpiece fixed thereto, and a turntable needs to match the workpiece to be heat treated. Thus, there is a lack in versatility.

According to the second related art, the workpiece is placed on the rotating rollers to rotate the workpiece by the rotating rollers. Thus, when the workpiece is large, so that deformation of the workpiece due to the heating is relatively large, it is not easy to maintain a constant gap between the heating coil and the workpiece. Further, when the workpiece is positioned by pressing the inner or outer surface of the workpiece by the positioning rollers, stress is applied to the heated and softened workpiece, which may result in deformation of the workpiece.

SUMMARY

The present invention has been made in view of the circumstances described above, and it is an object thereof to provide a heating apparatus, a heat treatment apparatus, and a heating method, capable of easier heat treatment with a wider range of use.

According to an aspect of the present invention, a heating apparatus is provided. The heating apparatus includes a workpiece support on which a ring-shaped workpiece is placed, a rotary drive assembly, and a heater configured to heat the workpiece. The workpiece support includes a plurality of rotating rollers arranged in a circumferential direction. The rotary drive assembly is configured to rotate the plurality of rotating rollers to rotate the workpiece placed on the workpiece support along a ring shape of the workpiece. The heater includes a heating coil configured to induction-heat the workpiece on the workpiece support at a heating position, and an actuator configured to move the heating coil at the heating position relative to the workpiece to adjust a distance between the workpiece and the heating coil.

The heating position may be between adjacent ones of the rotating rollers.

The heating apparatus may further include a position detector provided upstream of the heating position in a rotating direction of the workpiece to detect a position of a surface of the workpiece, so that the actuator moves the heating coil based on a detection by the position detector.

The heating apparatus may include a plurality of sets of the heaters and the actuators, and a plurality of said position detectors provided for the respective sets of said heaters and said actuators.

The rotary drive assembly may include a drive device, and a rotary drive mechanism configured to transmit a driving force of the drive device to the plurality of rotating rollers. The rotary drive mechanism may include a drive gear rotated by the drive device, and a plurality of driven gears, each of the driven gears being engaged with the drive gear and connected to an associated one of the rotating rollers.

According to another aspect of the present invention, a heat treatment apparatus is provided. The heat treatment apparatus includes the heating apparatus described above, and a cooling unit configured to cool the workpiece heated by the heater, and the drive device is disposed above the workpiece.

The heating apparatus may further include a central structure unit to which the workpiece support is connected such that the plurality of rotating rollers is arranged around the central structure unit and such that the workpiece is placed on the workpiece support to surround the central structure unit, a loading section in which the workpiece is placed on the plurality of rotating rollers, a heating section in which the heater is provided, and a conveyor mechanism configured to convey the workpiece support together with the workpiece in a suspended manner between the loading section and the heating section. The central structure unit may include a conveyor connecting portion connected to the conveyor mechanism to suspend the workpiece support together with the workpiece.

The conveyor mechanism may include a suspending portion engaged with the conveyor connecting portion such that the suspending portion is disengageable from the conveyor connecting portion in a lateral direction.

According to yet another aspect of the present invention, a heating method is provided. The heating method includes placing a ring-shaped workpiece on a plurality of rotating rollers arranged in a circumferential direction, setting the workpiece at a heating position to face a heating coil, moving the heating coil to adjust a position of the heating coil relative to the workpiece, rotating the rotating rollers to rotate the workpiece along a ring shape of the workpiece, and induction-heating the workpiece.

In this heating method, the rotating rollers may be connected to a central structure unit and arranged in the circumferential direction around the central structure unit, and the workpiece may be placed on the rotating rollers such that the workpiece surrounds the central structure unit. The heating method may further include after the placing is carried out in a loading section, conveying the workpiece together with the rotating rollers from the loading section to a heating section, in which the heating coil is provided, such that central structure unit is suspended.

According to yet another aspect of the present invention, a jig of a heating apparatus is provided. The jig is configured to support a ring-shaped workpiece when conveying and heating the workpiece. The jig includes a central structure unit, a rotary drive mechanism accommodated in the central structure unit, and a workpiece support connected to the central structure unit and configured such that the workpiece is placed on the workpiece support to surround the central structure unit. The workpiece support comprises a plurality of rotating rollers arranged in a circumferential direction around the central structure unit. The central structure unit includes a conveyor connecting portion configured to suspend the workpiece support together with the workpiece placed on the workpiece support, and a driver connecting portion from which a driving force is input to the rotary drive mechanism. The rotary drive mechanism is configured to rotate the rotating rollers by the driving force to rotate the workpiece along a ring shape of the workpiece.

The driver connecting portion may be disposed above the workpiece supported on the workpiece support.

The rotary drive mechanism may include a drive shaft connected to the driver connecting portion, and a plurality of driven shafts connected to the plurality of rotating rollers. The drive shaft may include a drive gear, and each of the driven shafts may include a driven gear engaged with the drive gear. In this configuration, the rotating rollers rotate the workpiece about a rotation center extending along the drive shaft.

The workpiece support may further include a workpiece positioning portion configured to position an inner circumference or an outer circumference of the workpiece, and the workpiece positioning portion may be provided in a protruding manner above the plurality of rotating rollers.

According to yet another aspect of the present invention, a heating apparatus is provided. The heating apparatus includes the jig described above, a loading section in which the workpiece is placed on the jig, a heating section comprising a heater configured to heat the workpiece placed on the jig, and a conveyor mechanism configured to convey the jig in a suspended manner between the loading section and the heating section. The conveyor connecting portion is connected to the conveyor mechanism.

The conveyor mechanism may include a base unit configured to be movable between the loading section and heating section, a suspending portion connected to the conveyor connecting portion, and a drive device connected to the driver connecting portion. The suspending portion and the drive device may be attached to the base unit. The drive device and the driver connecting portion may be connected together by connecting the suspending portion to the conveyor connecting portion.

The drive device may be engaged with the driver connecting portion such that and the drive device is disengageable from the driver connecting portion in a vertical direction, and the suspending portion may be engaged with the conveyor connecting portion such that the suspending portion is disengageable from the conveyor connecting portion in a lateral direction.

The suspending portion may include a plurality of locking pins arranged in the circumferential direction such that each of the locking pins is slidable in the lateral direction, and the conveyor connecting portion may include a plurality of locking holes into which the locking pins are inserted respectively, each of the locking holes having an upwardly tapered triangular shape.

The conveyor mechanism may further include a conveyor rail provided between the loading section and the heating section, a lifter; a biasing device, a lateral movement base configured to move along the conveyor rail and to which the lifter and the biasing device are attached, and a lifting base to which the suspending portion is attached. In this configuration, the lifting base is connected to the lateral movement base such that the lifting base is capable of moving up and down relative to the lateral movement base. The lifter is configured to move the lifting base up and down. The biasing device is configured to upwardly bias the lifting base when the lifting base is moving up.

The heating section may include a circumferential positioning portion configured to position the jig with respect to the circumferential direction.

The heating apparatus may further include a preparatory jig adapted to be suspended on the suspending portion, and a preparatory section configured to accommodate the preparatory jig. In this configuration, the conveyor rail is provided to extend to the preparatory section, and the preparatory jig is configured to hold a component of the heater, such as the heating coil.

According to yet another aspect of the present invention, a heat treatment apparatus is provided. The heat treatment apparatus includes the heating apparatus described above, and a cooling section disposed below the heating section such that, when the jig is lowered, the workpiece placed on the jig is cooled in the cooling section.

The heating section may include a stopper configured to support the jig from below such that the stopper releases the jig when cooling the workpiece in the cooling section.

When the jig is placed in the cooling section, the drive device may be disposed above the cooling section.

According to yet another aspect of the present invention, a heating method is provided. The heating method includes placing a jig in a loading section, the jig including a central structure unit and a plurality of rotating rollers connected to the central structure unit and arranged in a circumferential direction around the central structure unit, placing a ring-shaped workpiece on the plurality of rotating rollers such that the workpiece surrounds the central structure unit, conveying the jig from the loading section to a heating section such that the jig is suspended at the central structure unit, rotating the rotating rollers by transmitting a driving force input to the central structure unit to the rotating rollers to rotate the workpiece along a ring shape of the workpiece in the heating section, and induction-heating the workpiece by a heating coil.

Other aspects and advantages of the invention will be apparent from the following description, the drawings and the claims.

BRIEF DESCRIPTION OF THE DRAWINGS

FIGS. 10A to 10C are explanatory views illustrating operations for connecting the lifting base and the jig;

FIG. 13A is a rear view of a heater and an actuator of the heating section;

FIG. 13B is a side view of the heater and the actuator;

DETAILED DESCRIPTION

Hereinafter, an embodiment of the present invention will be described in detail with reference to the drawings.

The embodiment will be described by taking as an example a rotary quenching machine for quenching a large heating object. The heating object has a ring-shape having a diameter of 1 m or more, here, 3 m or more, and is a large turning ring, or an inner ring or an outer ring of a large bearing. A heating portion of the heating object has substantially the same shape along the entire circumference.

Overall Configuration

Figure 1:
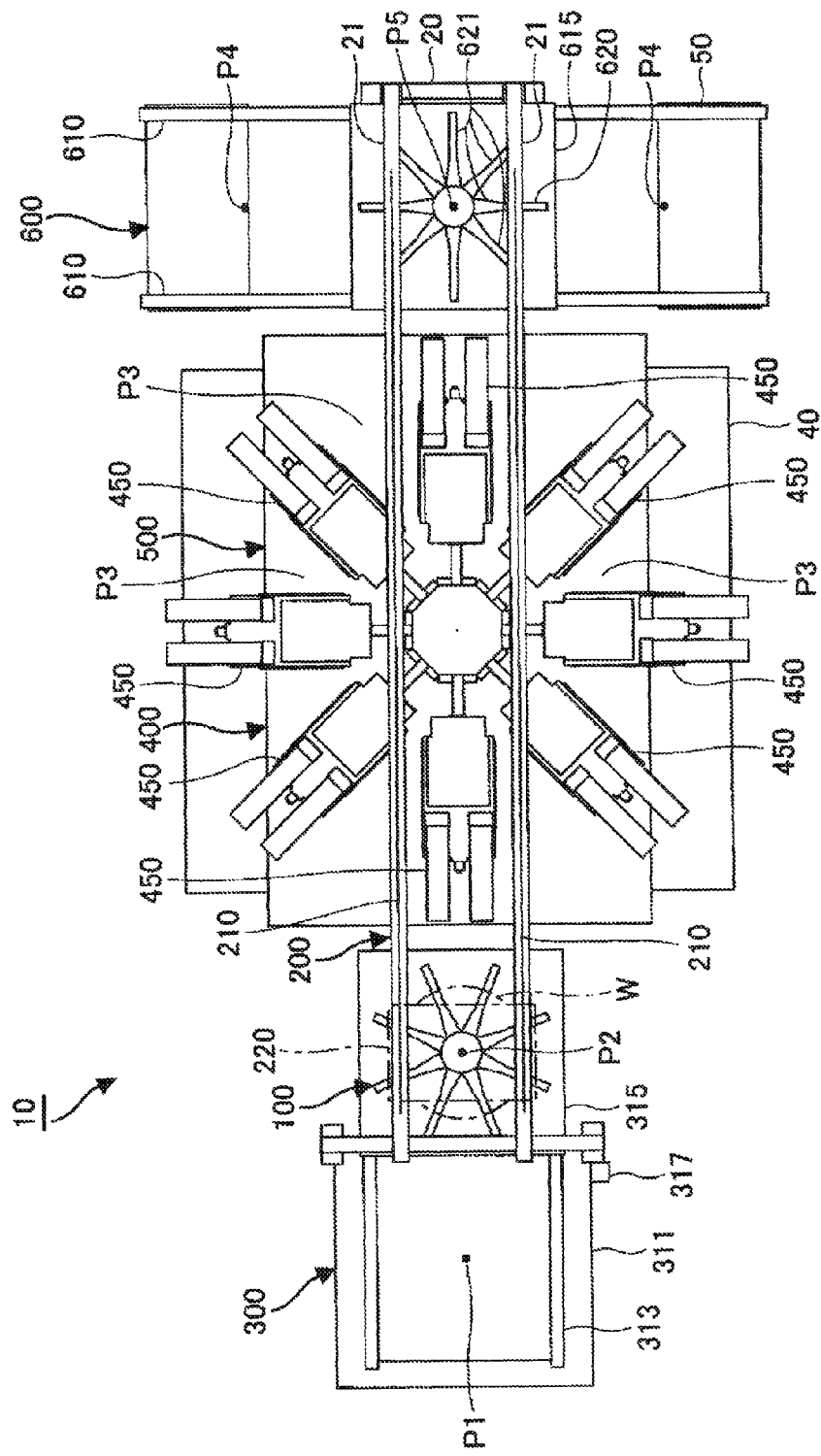
FIG. 1 is a plan view of a heat treatment apparatus according to an embodiment of the present invention.
Figure 2:
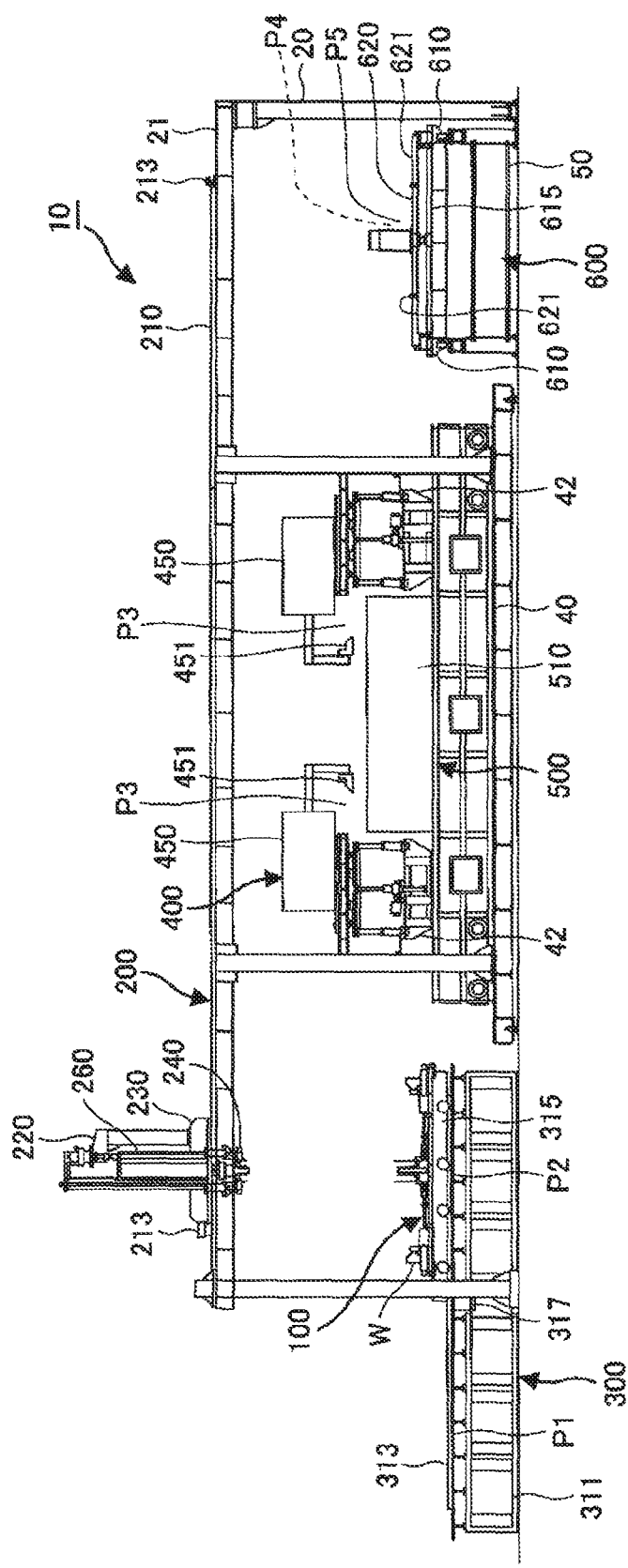
FIG. 2 is a side view of the heat treatment apparatus, without illustration of some heaters.

As shown in FIGS. 1 and 2, a heat treatment apparatus 10 includes a jig 100 configured to support a workpiece W, a loading and unloading section 300 where the workpiece W is loaded and unloaded, a conveyor mechanism 200 configured to convey the jig 100 while suspending it, a heating section 400 where the workpiece W placed on the jig 100 is heated while being rotated, a cooling section 500 provided below the heating section 400, and a component replacing section 600 (a preparatory section) provided at an opposite side from the loading and unloading section 300. The jig 100, the conveyor mechanism 200, the loading and unloading section 300, the heating section 400, and the component replacing section 600 form a heating apparatus.

Jig

Figure 3:
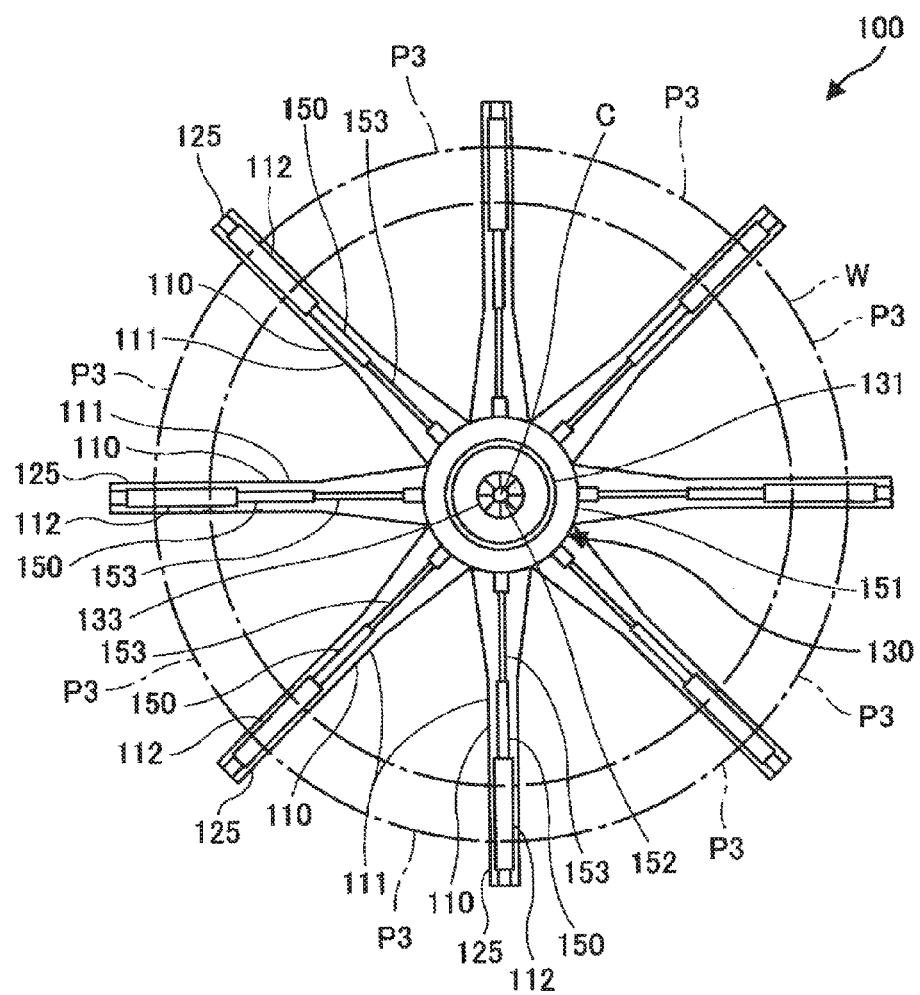
FIG. 3 is a plan view of a jig of the heat treatment apparatus.

As shown in FIGS. 3 and 4, the jig 100 includes a workpiece support 110 on which the workpiece W is placed, a central structure unit 130 at the center of the workpiece support 110, and a rotary drive mechanism 150 (a transmission unit) configured to rotate the workpiece W placed on the workpiece support 110 along a ring shape of the workpiece W.

The workpiece support 110 includes a plurality of radial bases 111 which are joined to a lower portion of the central structure unit 130 and which extends in a radial direction and rotating rollers 112 which are disposed at distal ends of the respective radial bases 111 along the radial direction. At least three or more radial bases 111 and rotating rollers 112 are provided. In this embodiment, eight radial bases 111 and rotating rollers 112 are provided so as to be aligned at equal intervals in a circumferential direction. A space is provided between adjacent ones of the radial bases 111.

Figure 4A:
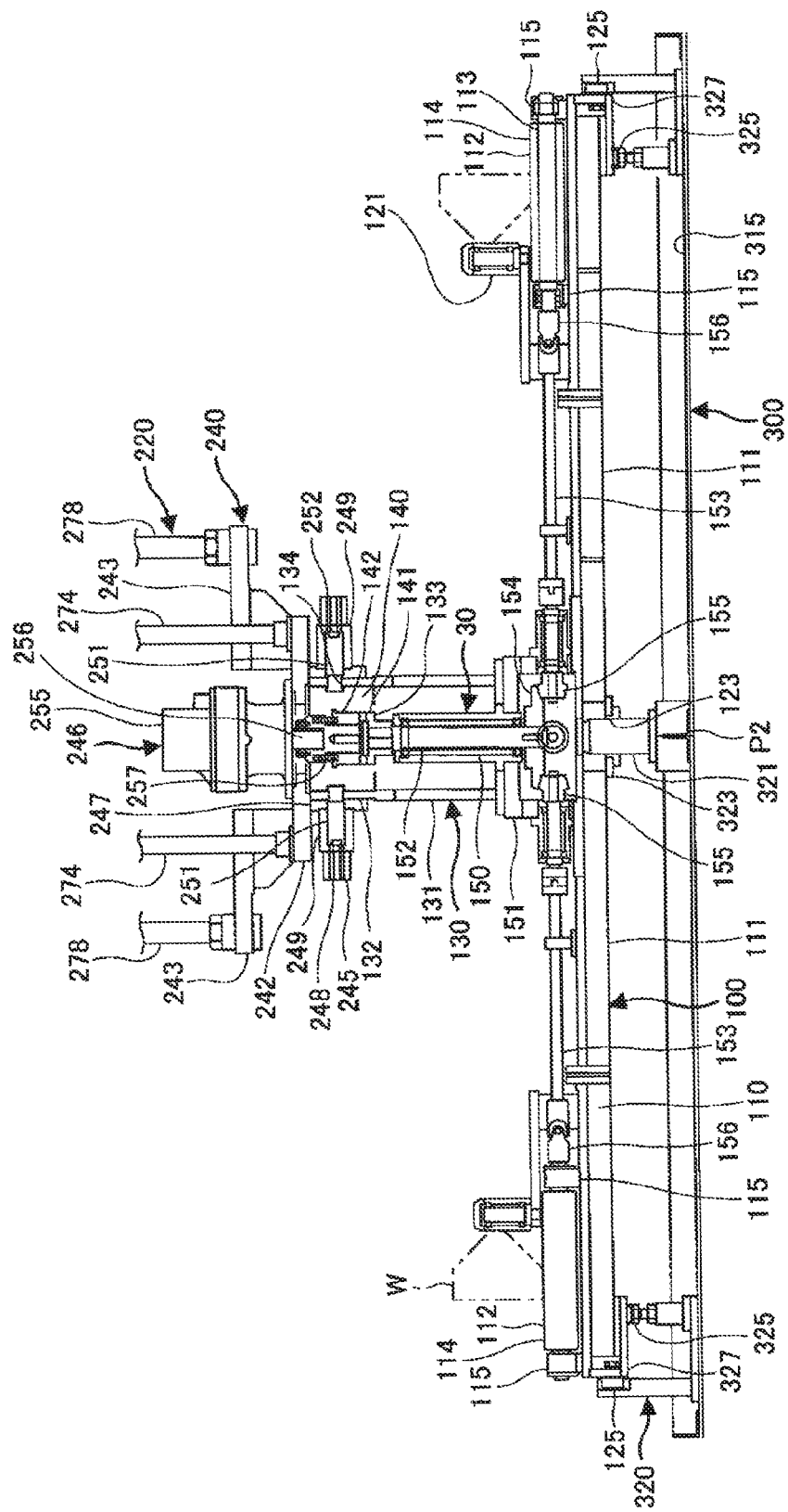
FIG. 4A is a vertical sectional view of the jig and an lifting base of the heat treatment apparatus.

As shown in FIG. 4A, each of the rotating rollers 112 has a core member 113, and a ceramic cylindrical member 114 fixed to a circumference of the core member 113. The core member 113 is rotatably supported by heat-resistant bearings 115 on the radial base 111 at their respective ends. In this embodiment, each of the cylindrical member 114 is formed to have a side circumferential surface having a constant diameter along its entire length, so that a portion of the side circumferential surface that contacts the workpiece W is substantially horizontal. The material and shape of the cylindrical members 114 can be changed in accordance with a workpiece W. For example, the cylindrical member 114 may be formed to have a smooth side circumferential surface or a textured side circumferential surface, e.g., with a plurality of grooves.

As shown in FIG. 4A, a workpiece positioning roller 121 is provided on each of the radial bases 111 to position an inner circumference or an outer circumference of the workpiece W. This workpiece positioning roller 121 is provided to project upwards from each rotating roller 112 so as to rotate freely about a substantially vertical axis.

As shown in FIG. 4A, the central structure unit 130 includes a cylindrical connecting protrusion 131 which projects upwards from the center of the workpiece support 110. A gearbox 151 and a drive shaft 152 of the rotary drive mechanism 150 are disposed in an interior of the connecting protrusion 131, so that the connecting protrusion 131 is concentric with the drive shaft 152.

The connecting protrusion 131 has a conveyor connecting portion 132 to suspend the entire jig 100 by a conveyor loader 220. A driver connecting portion 133 is disposed inside the connecting protrusion 131, and the driver connecting portion 133 is fixed to an end portion of the drive shaft 152. The conveyor connecting portion 132 includes a plurality of locking holes 134 formed at equal intervals along a circumference of the connecting protrusion 131. As shown in FIG. 14B, each of the locking holes 134 has a substantially triangular shape. The driver connecting portion 133 has a first engagement member 141 which forms a part of a dog clutch mechanism 140.

The locking holes 134 and the first engagement member 141, at which the conveyor connecting portion 132 and the driver connecting portion 133 are connected respectively, are arranged above an upper edge of the workpiece W that is supported on the plurality of rotating rollers 112.

The rotary drive mechanism 150 is provided in the central structure unit 130 and the workpiece support 110 so as to transmit a driving force input to an upper end portion of the central structure unit 130 to the rotating rollers 112. The rotary drive mechanism 50 includes the drive shaft 152 disposed in a vertical direction at the center of the central structure unit 130, and driven shafts 153 disposed individually on the respective radial bases 111 of the workpiece support 110 so as to connect the rotating rollers 112 to the central structure unit 130. The drive shaft 152 and the driven shafts 153 are connected to each other in the gearbox 151.

The driver connecting portion 133 is provided at an upper end of the drive shaft 152, and a drive gear 154 is fixed to a lower end of the drive shaft 152. The driving force is input to the driver connecting portion 133 from the conveyor mechanism 200. A driven gear 155 is provided at one end of each driven shaft 153, and the core member 113 of the rotating roller 112 is connected to the other end of each driven shaft 153 via a universal joint 156.

In the gearbox 151, the respective driven gears 155 of the driven shafts 153 are allowed to mesh with the drive gear 154 fixed to the drive shaft 152. Gear ratios of the drive gear 154 to the respective driven gears 155 are all the same.

As shown in FIG. 4A, a bottom portion positioning hole 123 is provided in a bottom portion of the central structure unit 130 for positioning the central structure unit 130. Cam followers 125 are provided at respective distal ends of the plurality of radial bases 111 for positioning the radial bases ill in the circumferential direction.

According to this jig 100, as shown in FIGS. 3 and 4A, the workpiece W is placed on the plurality of rotating rollers 112 of the workpiece support 110. A large positioning error of the workpiece W is prevented by the inner circumferential surface or outer circumferential surface of the workpiece W being brought into abutment with the workpiece positioning rollers 121.

In this state, the entire jig 100 on which the workpiece W is placed can be suspended at the central structure unit 130. When the driving force is input from the driver connecting portion 133 of the central structure unit 130, the respective rotating rollers 112 rotate, whereby the workpiece W rotates along the ring shape of the workpiece W.

Loading and Unloading Section

As shown in FIGS. 1 and 2, in the loading and unloading section 300, there are provided a loading and unloading position P1 where a workpiece W from the previous step is loaded and unloaded and a suspending position P2 where the jig 100 is connected to and disconnected from the conveyor mechanism 200. The loading and unloading section 300 includes a loading base 311, loading and unloading rails 313 which are provided substantially parallel on the loading base 311 so as to extend from the loading and unloading position P1 to the suspending position P2, a loading and unloading carriage 315 adapted to move along the loading and unloading rails 313 and a conveyor drive unit 317 which moves the loading and unloading carriage 315.

As shown in FIG. 4A, a jig supporting structure 320 is provided on the loading and unloading carriage 315 for supporting the jig 100. The jig supporting structure 320 includes a engagement protrusion 321 adapted to be fitted in the bottom portion positioning hole 123 in the jig 100 so as to dispose the central structure unit 130 in a predetermined position, a central supporting base 323 provided around a circumference of the engagement protrusion 321 so as to be brought into abutment with the bottom portion of the central structure unit 130 to support the central structure 130, distal-end supporting bases 325 adapted to be brought into abutment with respective distal-end bottom portions of the radial bases 111 to support the radial bases 111 at the distal ends thereof, and positioning recess portions 327 adapted to accommodate therein the cam followers 125 provided at the distal ends of the radial bases 111 so as to position the radial bases 111 in the circumferential direction.

In this loading and unloading section 300, the loading and unloading carriage 315 is disposed in the loading and unloading position P1, so that the workpiece W is placed on the workpiece support 110 of the jig 100. The loading and unloading carriage 315 is moved from the loading and unloading position P1 to the suspending position P2 by the conveyor drive unit 317 and is then stopped in the suspending position P2. This enables the central structure unit 130 of the jig 100 to be disposed in the suspending position P2 while being oriented in a predetermined direction with good accuracy.

Conveyor Mechanism

As is shown in FIGS. 1 and 2, the conveyor mechanism 200 has conveyor rails 210 which are disposed over the respective sections and the conveyor loader 220 adapted to move along the conveyor rails 210.

A pair of side frame members 21 are disposed on a frame 20 so as to extend continuously and substantially horizontally above the loading and unloading section 300, the heating and cooling sections 400, 500 and the component replacing section 600. The conveyor rails 210 are provided individually on the pair of side frame members 21 so as to be parallel to each other.

Figure 5:
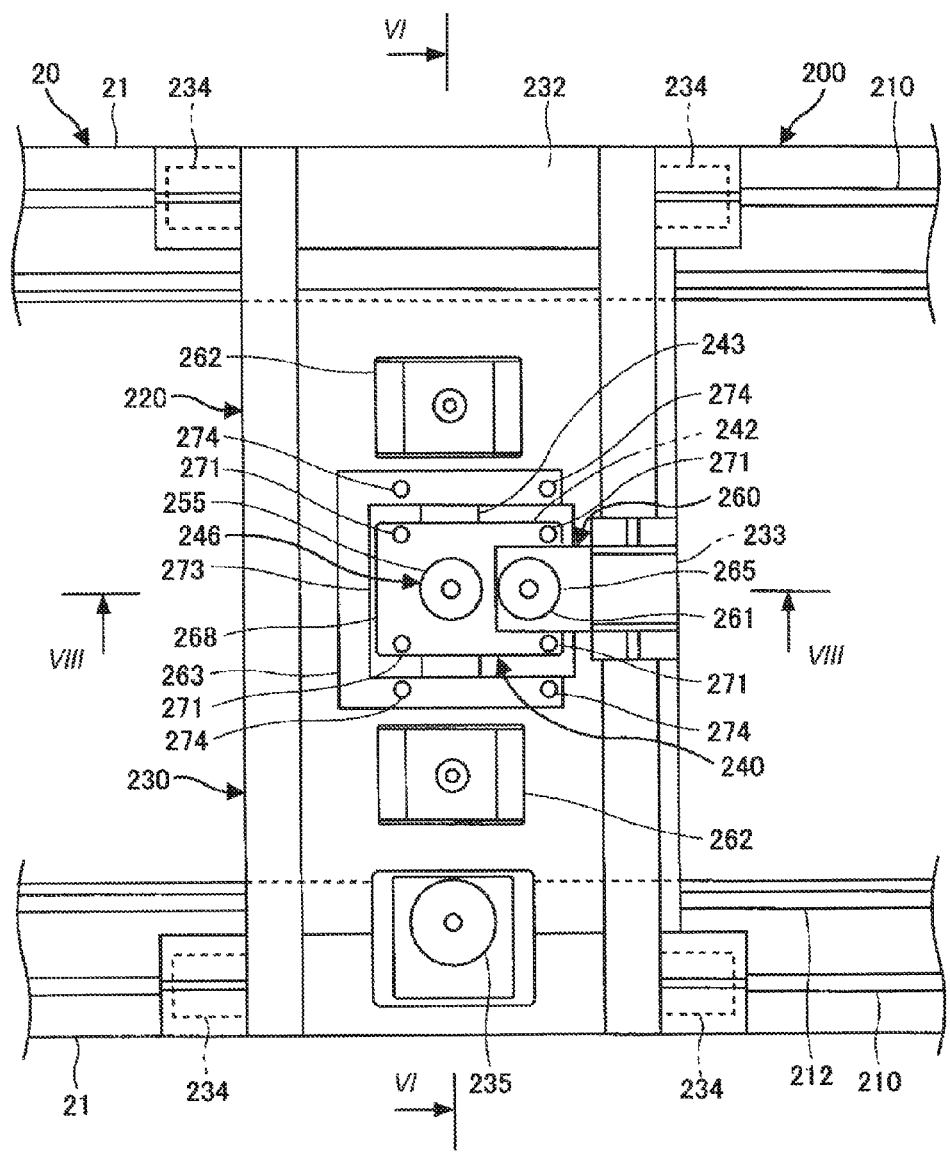
FIG. 5 is a plan view of a conveyor loader of a conveyor mechanism of the heat treatment apparatus.
Figure 6:
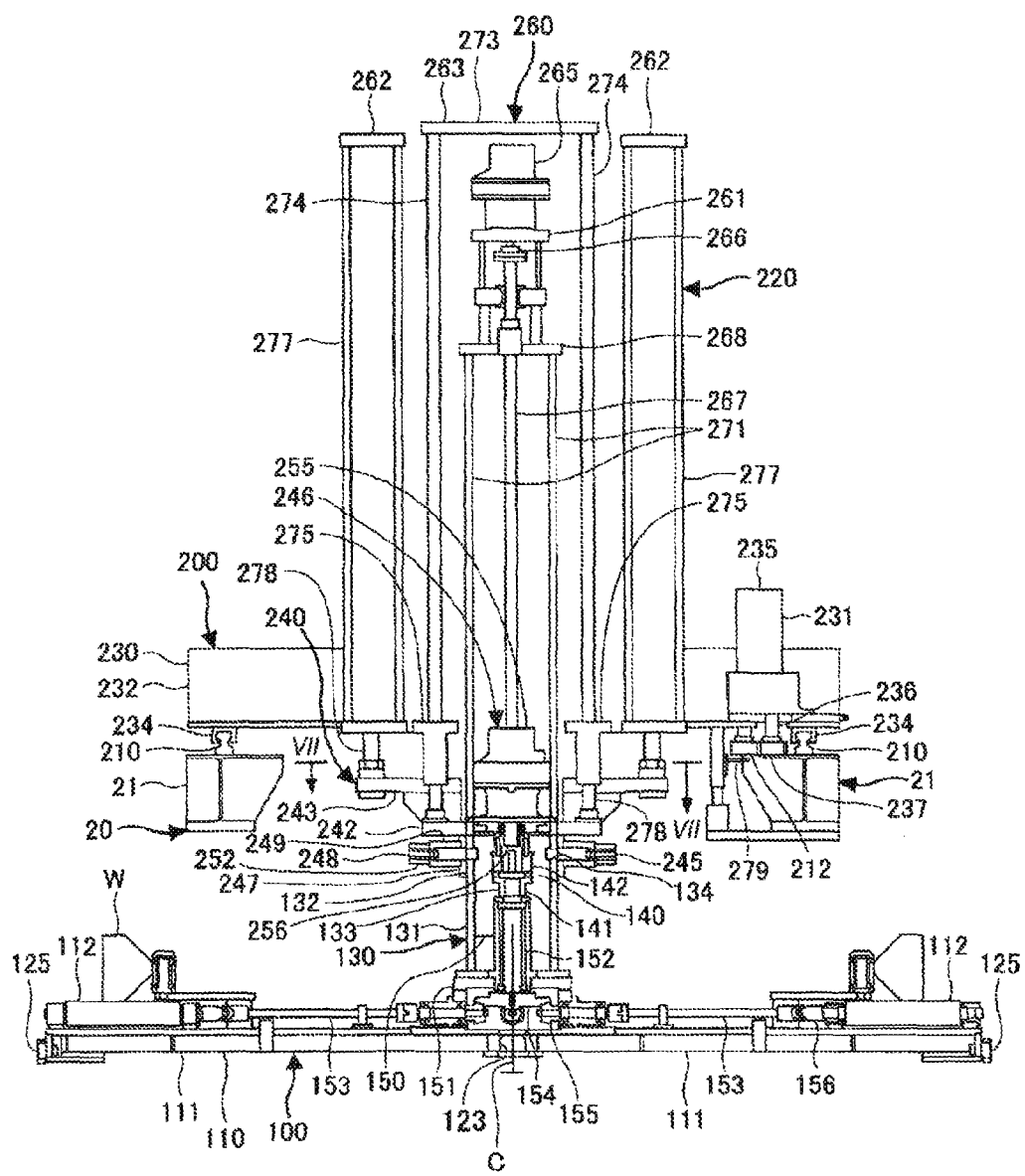
FIG. 6 is a sectional view of the conveyor mechanism taken along the line VI-IV in FIG. 5.

As shown in FIGS. 5 and 6, a linear rack 212 is provided lateral to a side surface of one of the conveyor rails 210 so as to extend continuously over a substantially entire length of the conveyor rail 210, and a pinion 237 of the conveyor loader 220 meshes with the rack 212. As indicated by an imaginary line in FIG. 8, a rail stopper 213 is provided at an end portion of the conveyor rail 212 to stop the conveyor loader 220 at a given position. While the rail stopper 213 at the end portion of the conveyor rail 212 on a side of the loading and unloading section 300 is illustrated in FIG. 8, a similar rail stopper 213 is also provided at an end portion of the conveyor rail 212 on a side of the component replacing section 600.

As shown in FIGS. 5 and 6, the conveyor loader 220 includes a lateral movement base 230 disposed on the conveyor rails 210 so as to move along the conveyor rails 210, a lateral movement mechanism 231 configured to move the lateral movement base 230, an lifting base 240 connected to a lower portion of the lateral movement base 230 to move together with the lateral movement base 230, and an lifting mechanism 260 configured to move the lifting base 240 up and down relative to the lateral movement base 230.

Figure 8:
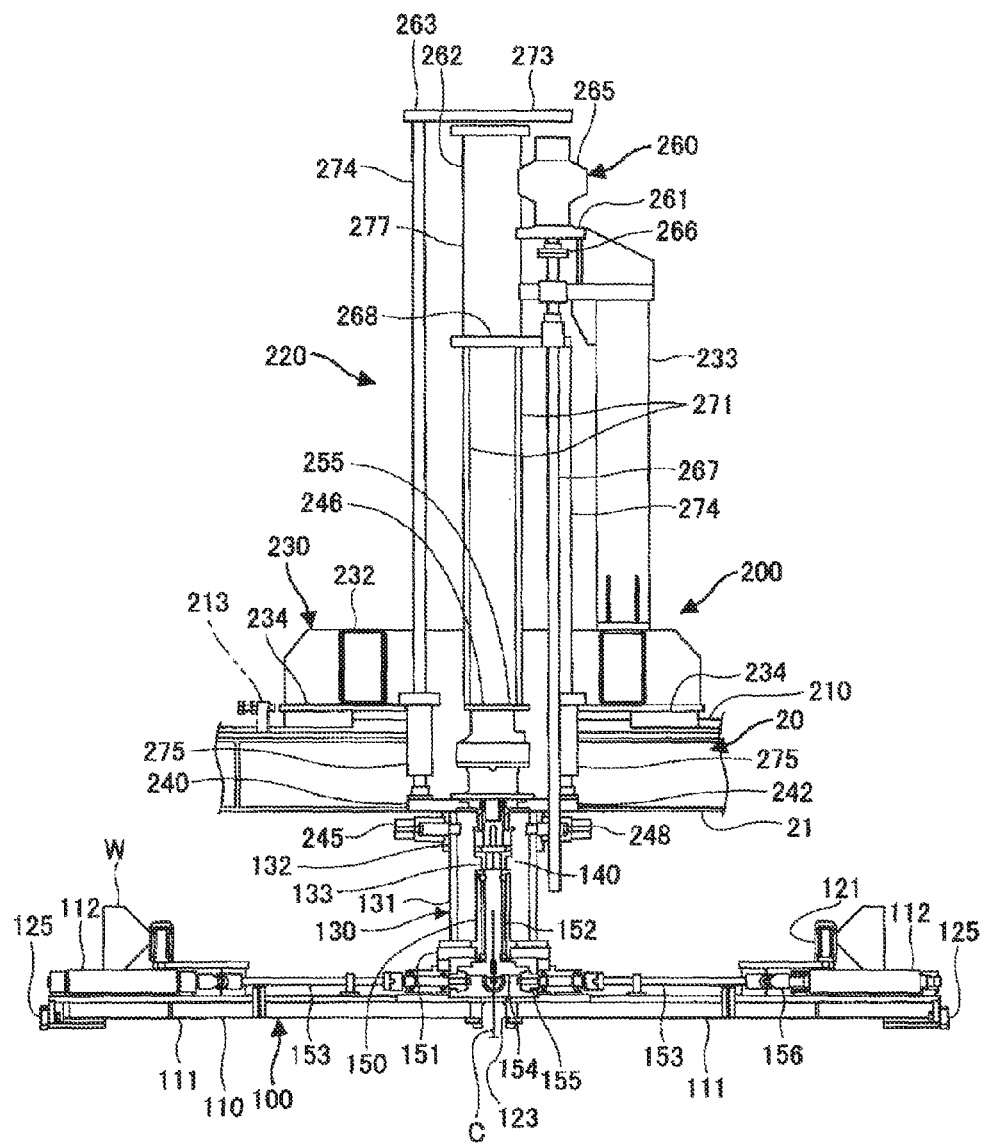
FIG. 8 is a sectional view of the conveyor mechanism taken along the line VIII-VIII in FIG. 5.

As shown in FIGS. 5 and 8, the lateral movement base 230 includes a lateral movement table 232 which has a width equal to or wider than a space between the pair of conveyor rails 210 and a lateral movement support 233 which is erected at an intermediate portion in a width direction of the lateral movement table 232.

As shown in FIGS. 5 and 6, the lateral movement mechanism 231 includes a lateral movement support member 234, such as a rolling ring or a slider, configured to movably support the lateral movement table 232 on the pair of conveyor rails 210, a lateral movement motor 235 (e.g., a geared motor) secured to the lateral movement table 232 and whose rotation speed is adjustable, and the pinion 237 connected to an output shaft 236 of the lateral movement motor 235 and adapted to mesh with the rack 212 on the conveyor rail 210.

Figure 7:
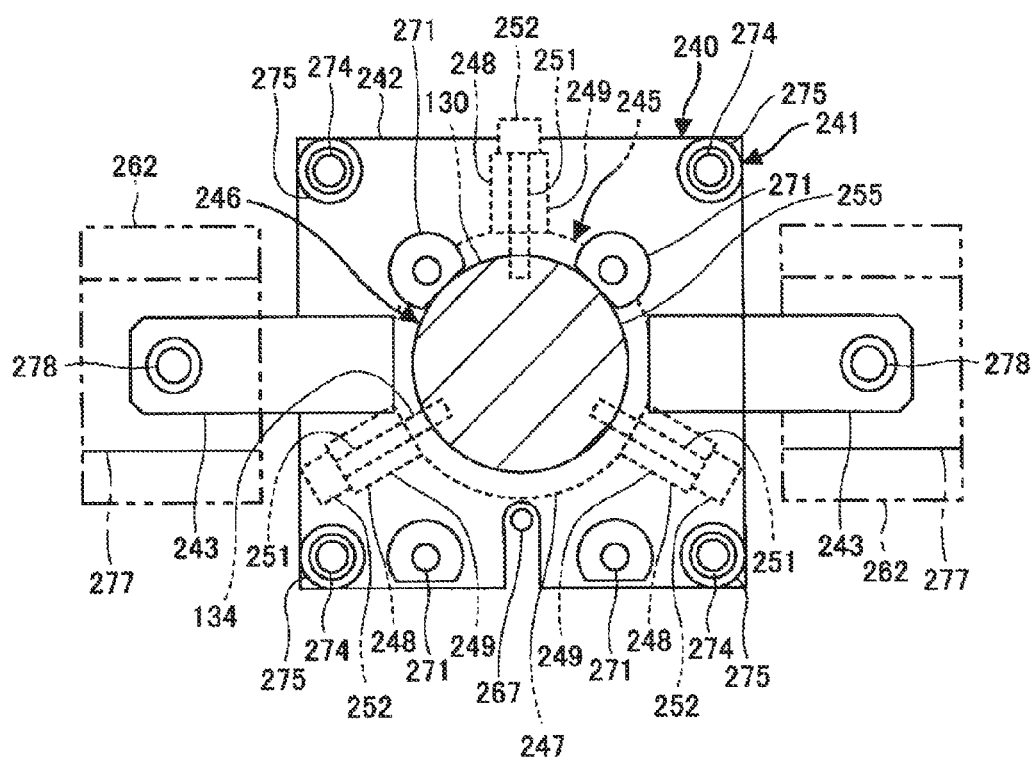
FIG. 7 is a sectional view of the conveyor mechanism taken along the line VII-VII in FIG. 6.

As shown in FIGS. 6 and 7, the lifting base 240 includes a lifting support base 242, and lifting auxiliary bases 243 which are provided above and integrally with respective sides of the lifting support base 242. The lifting base 240 is mounted on the lateral movement base 230 via the lifting mechanism 260. The lifting support base 242 includes a suspending portion 245 for connection to the conveyor connecting portion 132 of the jig 100 and a rotary drive device 246 connected to the driver connecting portion 133 of the jig 100 so as to drive the drive shaft 152.

As shown in FIGS. 4A, 6 and 7, the suspending portion 245 includes a cylindrical suspending protrusion 247 extending downward from the lifting support base 242 to accommodate an upper end portion of the connecting protrusion 131 of the jig 100, and a plurality of locking devices 248 provided at positions corresponding to the locking holes 134 of the jig 100.

Figure 4B:
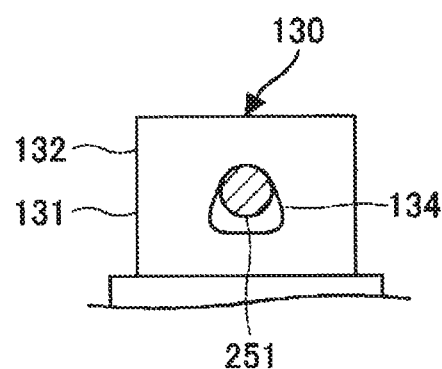
FIG. 4B is a partial side view of a central portion of the jig.

Each of the locking devices 248 includes a holding member 249 fixed to the suspending protrusion 247, a locking pin 251 held by the holding member 249 so as to slide in a horizontal direction, and a locking drive portion 252 (e.g., an air cylinder) configured to drive the locking pin 251. As shown in FIG. 4B, the locking hole 134 in the jig 100 is formed into a substantially triangular shape which is larger than the locking pin 251. The locking hole 134 has a width which is wider than the locking pin 251 at a lower side and a width which corresponds to the locking pin 251 at an upper side thereof.

As shown in FIGS. 4A and 6, the rotary drive device 246 includes a rotary drive motor 255 (e.g., a servo motor) fixed to the lifting support base 242, a second engagement member 142 mounted on an output shaft 256 of the rotary drive motor 255, and a engagement biasing member 257 (e.g., a spring) configured to bias the second engagement member 142 downwards along the output shaft 256.

The rotary drive device 246 is engaged with and disengaged from the driving connecting device 133 of the jig 100 in a vertical direction. The second engagement member 142 of the output shaft 256 of the rotary drive motor 255 is brought into meshing engagement with the first engagement member 141 of the drive shaft 152 of the jig 100, whereby the dog clutch mechanism 140 is provided. Thus, the rotary drive assembly 30 for rotating the workpiece W is configured such that the rotary drive device 246 is connected to the driver connecting portion 133 of the jig 100 by the dog clutch mechanism 140.

As shown in FIGS. 6 to 8, the lifting mechanism 260 includes a lifter 261 configured to move the lifting base 240 up and down, a biasing device 262 configured to bias the lifting base 240 upwards when the lifting base 240 is moving up, and an lifting guide 263 configured to guide the up and down movement of the lifting base 240.

The lifter 261 includes a lifting motor 265 (e.g., a servo motor) fixed to an upper portion of the lateral movement support 233 of the lateral movement base 230, a screw shaft 267 fixed to an output shaft 266 of the lifting motor 265 and disposed rotatably in a substantially vertical direction, an lifting plate 268 screwed to the screw shaft 267 so as to move up and down in association with the rotation of the screw shaft 267, and four connecting rods 271 disposed in the vertical direction to connect the lifting plate 268 and the lifting support base 242 of the lifting base 240.

The lifting guide 263 includes four lifting guide rods 274 connected to the lifting support base 242 at lower ends thereof and connected together by a connecting plate 273 at upper ends thereof, and four bearings 275 fixed to the lateral movement table 232 of the lateral movement base 230 to support the respective lifting guide rods 274 in a vertically movable manner. The four lifting guide rods 274 are disposed substantially in the vertical direction so as to be movable in the vertical direction.

The biasing device 262 includes two hydraulic or pneumatic cylinders 277 that are fixed to the lateral movement table 232. A linearly moving rod 278 of each hydraulic cylinder 277 is disposed substantially in the vertical direction and is fixed to the lifting auxiliary base 243.

In this conveyor mechanism 200, in order to cause the conveyor loader 220 to run on the conveyor rails 210, as shown in FIGS. 5 and 6, the lateral movement motor 235 is driven to rotate the pinion 237 which meshes with the rack 212 clockwise or counterclockwise. The conveyor loader 220 can be stopped accurately in predetermined positions over the loading and unloading section 300, the heating and cooling sections 400, 500 and the component replacing section 600 by the rail stoppers 213 and a position detecting sensor 279 shown in FIG. 6.

To connect the jig 100 to the conveyor loader 220 and suspend the jig on the conveyor loader 220, the lateral movement base 230 of the conveyor loader 220 is stopped in position, and the lifting base 240 is lowered. Then, the suspending portion 245 is connected to the conveyor connecting portion 132 of the jig 100, the rotary drive device 246 is connected to the rotary drive mechanism 150 of the jig 100, and the lifting base 240 is lifted up.

Figure 9:
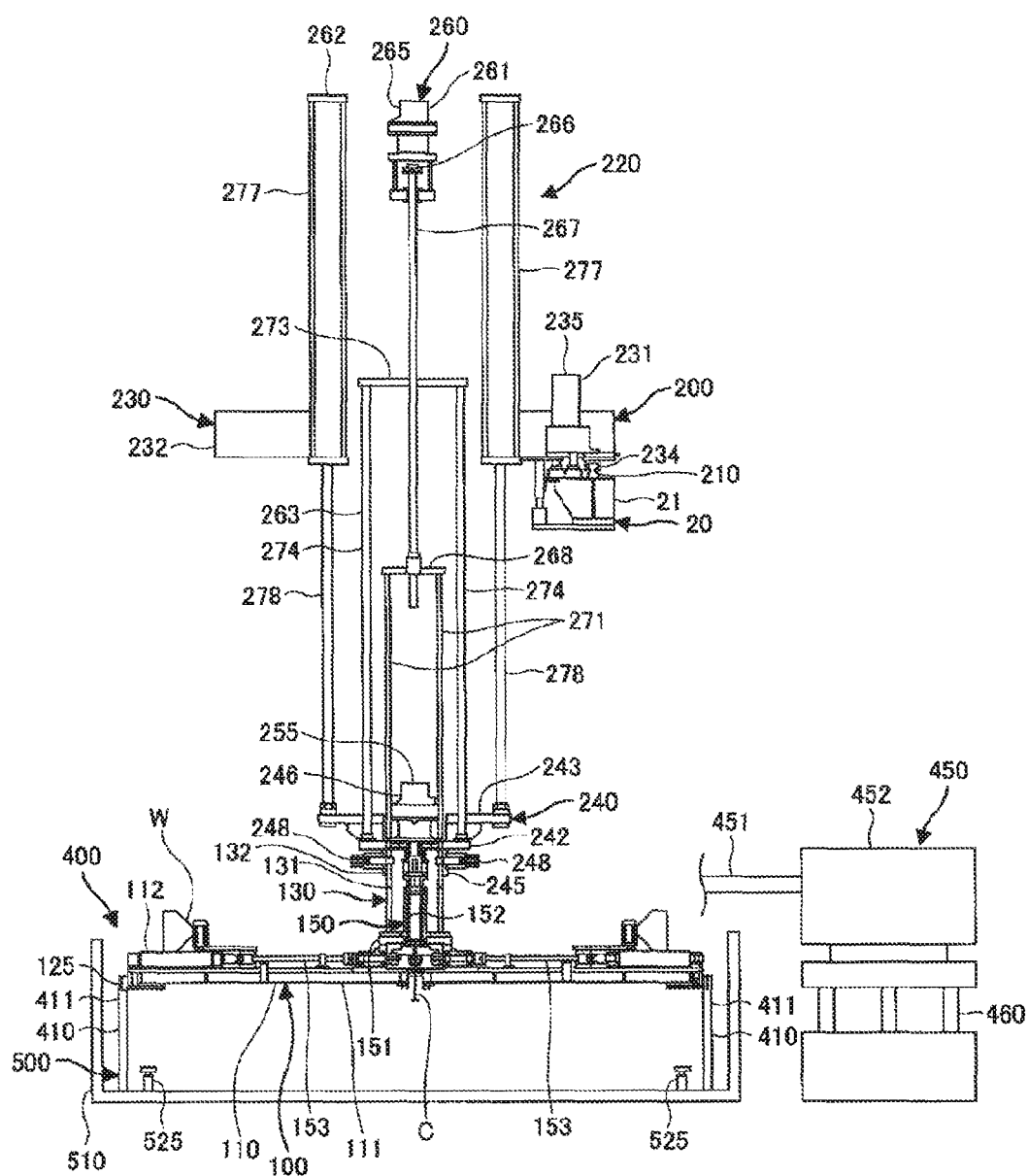
FIG. 9 is a partial side view of the heat treatment apparatus in which the lifting base is lowered.

To lower the lifting base 240 by the lifting mechanism 260, as shown in FIGS. 6 and 8, the screw shaft 267 is rotated by the lifting motor 265 of the lifter 261 to move the lifting plate 268 down, so that the lifting base 240 is lowered. The linearly moving rods 278 of the hydraulic cylinders 277 follow the movement of the lifting base 240, and are pulled downwards. FIG. 9 shows a state in which the lifting base 240 is lowered.

To move the lifting base 240 upward, the screw shaft is rotated counterclockwise. At the same time, hydraulic pressure is supplied to the hydraulic cylinders 277 to bias the lifting base 240 upwards by the linearly moving rods 278. In this way, the lifting base 240 is moved upwards by the lifter 262 while being biased upwards by the biasing device 262.

In order to connect the suspending portion 245 to the conveyor connecting portion 132 of the jig 100, the conveyor loader 220 is stopped with good accuracy relative to the jig 100. By doing this, the lifting base 240 and the central structure unit 130 of the jig 100 are disposed in a predetermined relative position while being oriented relative to each other.

As shown in FIG. 10A, the lifting base 240 is moved down, so that the connecting protrusion 131 of the jig 100 is inserted into the suspending protrusion 247. As shown in FIG. 10B, the lifting base 240 is moved down to a certain height, so that the height of the locking devices 248 and the height of the conveyor connecting portion 132 coincide with each other. To do this, alternatively, an upper end of the connecting protrusion 131 may be brought into abutment with an apex portion inside the suspending protrusion 247 so that the height of the locking devices 248 and the height of the conveyor connecting portion 132 are caused to coincide with each other.

As shown in FIG. 10C, the respective locking pins 251 are caused to advance in the horizontal direction such that the suspending portion 245 and the conveyor connecting portion 132 of the jig 100 are disposed in the predetermined relative position. Then, the respective locking pins 251 are inserted into the corresponding locking holes 134 in the conveyor connecting portion 132 to thereby be locked in place in the locking holes 134 in the connecting protrusion 131. This enables the suspending portion 245 and the connecting protrusion 131 to be connected to each other. When the locking pins 251 are withdrawn in the horizontal direction, the locking pins 251 are disengaged from the locking holes 134 to thereby release the locked state.

As shown in FIG. 4B, the locking hole 134 is formed into the substantially triangular shape which is narrow on an upper side of the locking pin 251 and is wider on a lower side thereof. Therefore, the locking pin 251 can easily be engaged in and disengaged from a lower side of the locking hole 134. When the lifting base 240 is moved up to suspend the jig 100 such that the locking pins 251 are kept inserted in the locking holes 134, the locking pins 251 are locked at the upper side of the locking holes 134. Therefore, the jig 100 can be positioned with the conveyor loader 220 with good accuracy.

The rotary drive device 246 is connected to the driver connecting portion 133 of the jig 100 at the same time as the suspending portion 245 is connected to the conveyor connecting portion 132.

As shown in FIG. 10A, when the lifting base 240 is moved down from a position above the jig 100, as shown in FIG. 10B, the second engagement member 142 of the rotary drive motor 255 is inserted into the connecting protrusion 131 of the jig 100, so as to be brought into meshing engagement with the first engagement member 141 of the driver connecting portion 133 in the vertical direction. In this state, when the locking devices 248 and the conveyor connecting portion 132 are locked together in the horizontal direction as shown in FIG. 10C, the lifting base 240 is connected to the connecting protrusion 131 of the jig 100, whereby the meshing engagement state between the first engagement member 141 and the second engagement member 142 is maintained.

The second engagement member 142 is biased downwards by the engagement biasing member 257. Therefore, a certain degree of freedom is provided in the vertical relative position between the first engagement member 141 and the second engagement member 142, whereby when connected together, the first engagement member 141 and the second engagement member 142 can be connected together in a smooth manner. Once both the meshing members are connected together, the meshing engagement state can be maintained with an appropriate pressure.

By the rotary drive device 246 and the driver connecting portion 133 of the jig 100 being connected together as shown in FIG. 10C, the driving force of the rotary drive device 246 is transmitted to the rotating rollers 112 via the rotary drive mechanism 150, whereby the rotating rollers 112 can be driven to rotate by the rotary drive assembly 30.

Heating Section

Figure 11:
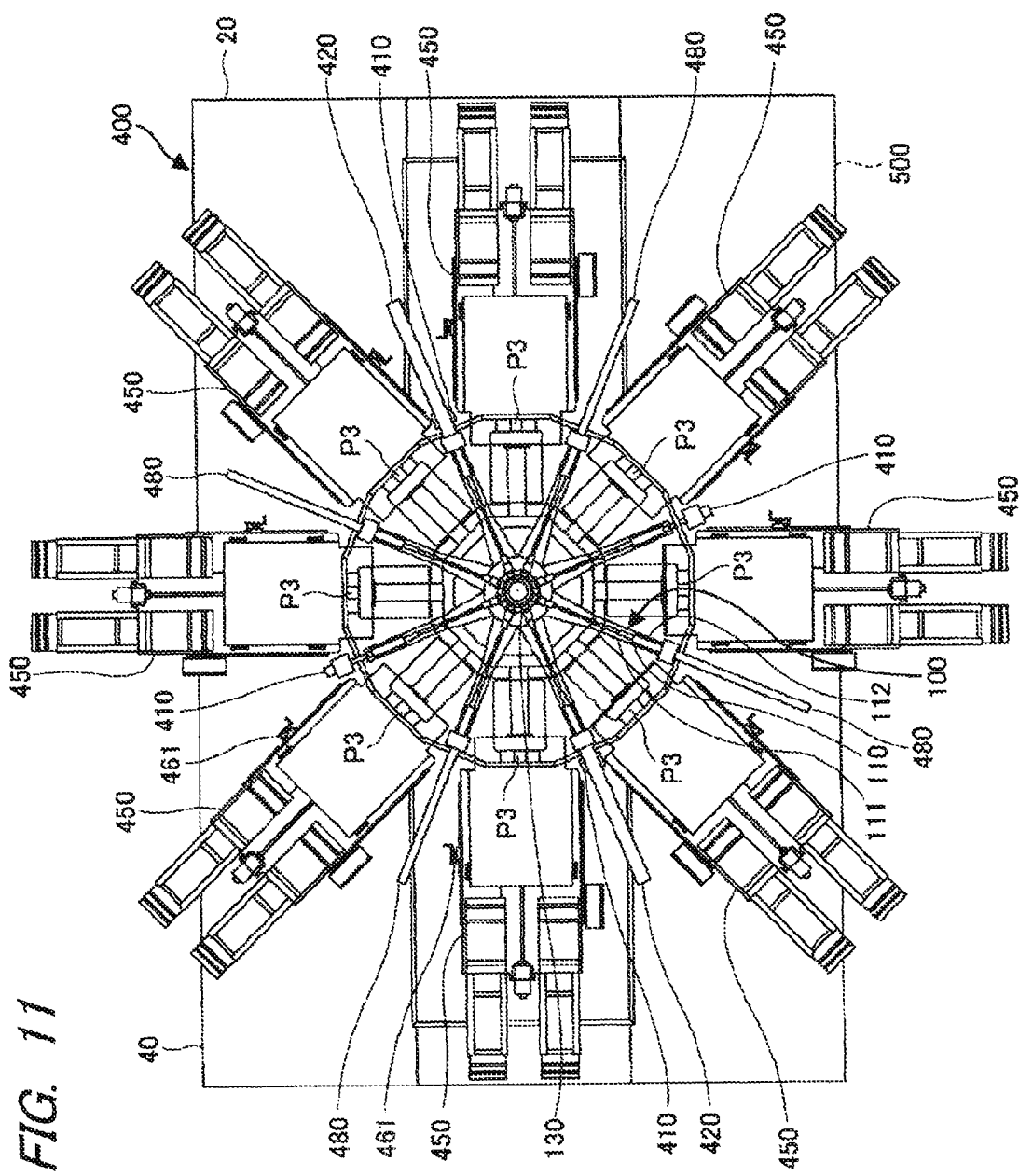
FIG. 11 is a plan view of a heating section of the heat treatment apparatus.
Figure 12:
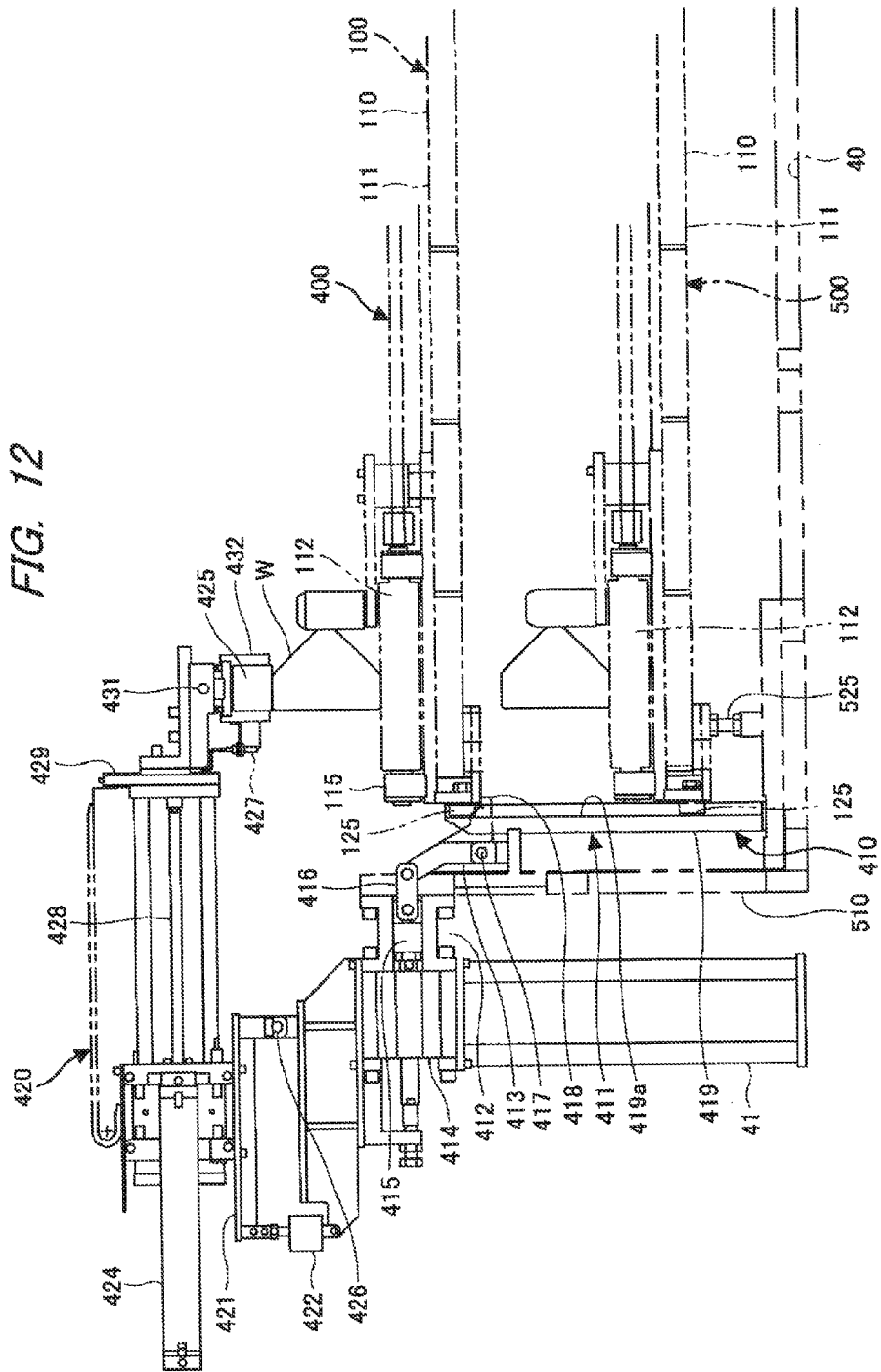
FIG. 12 is a side view of a jig stopper and a workpiece holding unit of the heating section.

As shown in FIGS. 2, 11 and 12, the heating section 400 includes jig holding mechanisms 410 disposed on a heat treatment base 40 on the frame to holding the jig 100 in position, workpiece holding units 420 configured to hold the workpiece W on the jig 100, and heaters 450 configured to heat the workpiece W on the jig 100.

The jig holding mechanisms 410 and the heaters 450 are provided around the center of the jig 100, that is, a rotation center C of the workpiece W. The jig holding mechanisms 410 are provided in positions which correspond to the radial bases 111 and the rotating rollers 112 on the jig 100. The jig holding mechanisms 410 may be provided in all the positions which correspond to the radial bases 111 and the rotating rollers 112. However, in this embodiment, the jig holding mechanisms 410 are provided in part or some of the positions which correspond to the radial bases 111 and the rotating rollers 112. Specifically, the jig holding mechanisms 410 are provided in four locations which are spaced at substantially equal intervals.

Heating positions P3 where the workpiece W is heated are set in spaces between the adjacent ones of the radial bases 111 of the jig 100, and the respective heaters 450 are provided so as to correspond to the heating positions P3. The heaters 450 are disposed preferably at substantially equal intervals in the circumferential direction relative to the rotation center C of the workpiece W.

As shown in FIG. 12, the jig holding mechanism 410 includes a circumferential positioning portion 411 adapted to position the jig 100 in the circumferential direction and a heightwise positioning portion 412 adapted to position the jig 100 in a height direction.

As shown in FIG. 12, the heightwise positioning portion 412 includes a jig stopper 413 provided inside a tub 510 in a swingable manner to support the jig 100 from below, a stopper drive cylinder 414 provided on a stopper support 41 of the heat treatment base 40 to swing the jig stopper 413, and a link 416 connecting the jig stopper 413 and a rod 415 of the stopper drive cylinder 414. When the rod 415 moves in the horizontal direction, the jig stopper 413 swings about a stopper fulcrum 417, a supporting end 418 is moved between a supporting position, at which the jig 100 is supported, and a releasing position below the supporting position.

As shown in FIG. 12, the circumferential positioning portion 411 includes a plurality of guide rails 419 which are erected within the tub 510 of the cooling section 500, which will be described later. The guide rail 419 has a guide groove 419a which is opened at an upper end thereof and is disposed in a substantially vertical direction. By the cam followers 125 at the distal ends of the radial bases 111 of the jig 100 being accommodated in the guide grooves 419a, the respective radial bases 111 are guided when the jig 100 is moved up and down, and the jig 100 is positioned circumferentially and radially in the respective positions.

The workpiece holding unit 420 is provided on part or all of the heightwise positioning portions 412. As shown in FIG. 12, the workpiece holding unit 420 includes a swing base 421 provided on the stopper support 41 on the heat treatment base 40, and a pushing drive unit 422 (e.g., an air cylinder) configured to swing the swing base 421. A linear drive unit 424 (e.g., an air cylinder) is mounted on the swing base 421, and a holding bracket 429 is fixed to a distal end of a linearly moving rod 428 of the linear drive unit 424. A roller bracket 432 is supported rotatably by a rotary shaft 431 provided in the holding bracket 429, and a holding roller 425 is supported rotatably in the roller bracket 432. The rotary shaft 431 is disposed substantially horizontally so as to be perpendicular to the linearly moving rod 428. The holding roller 425 is disposed substantially horizontally so as to be perpendicular to the rotary shaft 431.

The swing base 421 swings about a swing fulcrum 426. The linear drive unit 424 swings together with the swing base 421 and reciprocates from the rotation center C of the workpiece W along the radial direction. The holding roller 425 is caused to swing and reciprocate by the linear drive unit 424 and further is caused to swing by the rotary shaft 431. Therefore, the holding roller 425 is brought into abutment with the workpiece W on the jig 100 and rotates about a substantially horizontal axis.

Figure 13C:
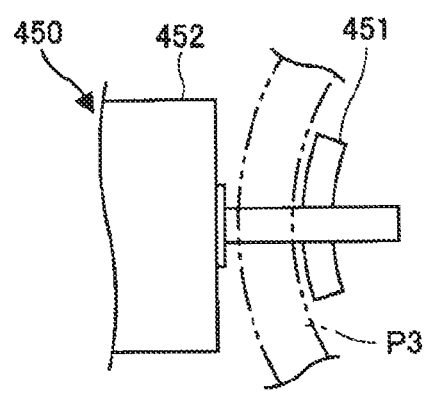
FIG. 13C is a partial plan view of the heater.

As shown in FIGS. 13A to 13C, each of the heaters 450 includes a heating coil 451 configured to induction-heat the workpiece W on the jig 100 at the heating position P3, a support box 452 accommodating a transformer inside and supporting the heating coil 451, and an actuator 460 configured to move the support box 452 to move the heating coil 451. The heater 450 includes a position detector 480 configured to detect a surface position of the workpiece W. In this embodiment, a position adjusting handle 461 is provided which controls in advance the position of the heating coil 451 in the vertical and horizontal directions, as well as a distance from the rotation center C of the workpiece W. However, a detailed illustration thereof is omitted herein.

As shown in FIGS. 13B and 13C, the heating coil 451 is configured so as to be disposed to face a surface of a portion of the circumference of the workpiece W disposed at the heating position P3 with a gap therebetween. In this embodiment, when viewed from above, the heating coil 451 is formed into an arc shape that corresponds to an arc shape of the portion of the workpiece W to be heated, and a vertical section of the heating coil 451 corresponds to a vertical section of the portion of the workpiece W to be heated.

Figure 17A:
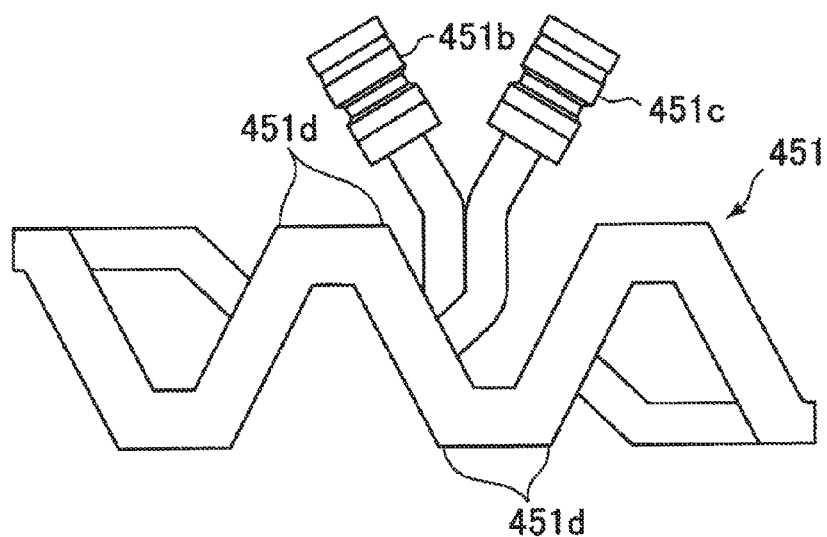
FIG. 17A is a front view of a heating coil of the heat treatment apparatus.
Figure 17B:
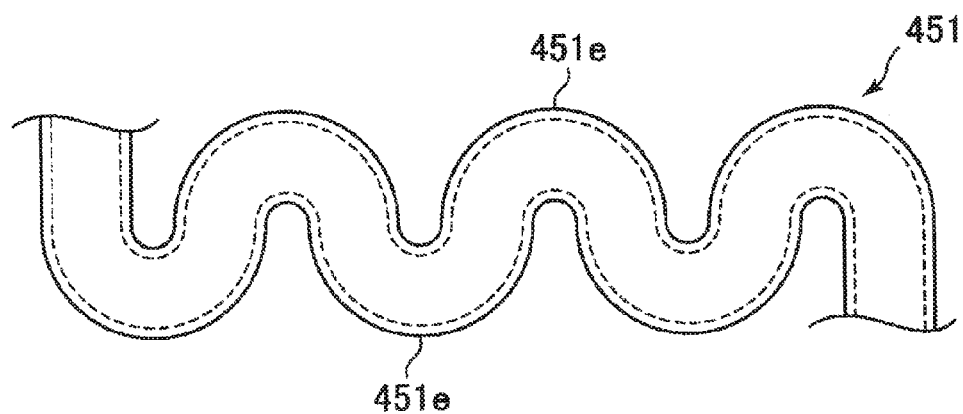
FIG. 17B is a partial front view illustrating a shape of a workpiece-facing portion of a heating coil according to a modified example.
Figure 18:
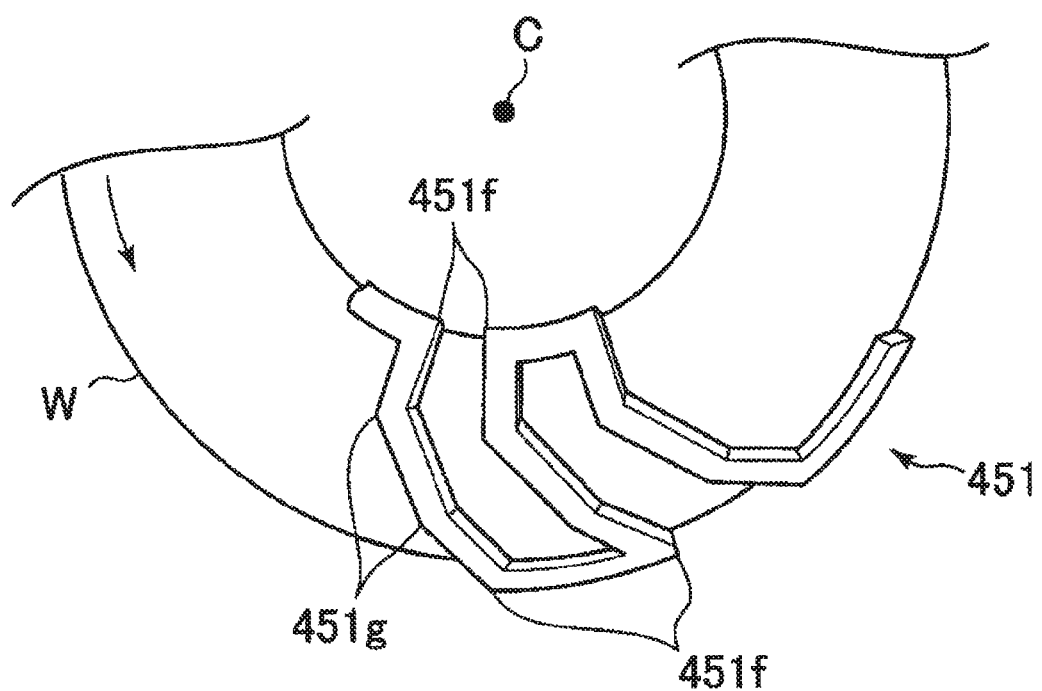
FIG. 18 is a partial front view showing a shape of a portion of a workpiece-facing heating coil according to another modified example.

For example, the heating coil 451 may be a pipe-shaped, rod-shaped or plate-shaped coil material having a substantially constant cross-section and wound up and down repeatedly in certain regions along the circumferential direction of the workpiece W. Specifically, as shown in FIG. 17A, angular pipes are joined together such that a hollow portion is continuously formed along the entire length of the joined pipes. With an inlet port 451b and an outlet port 45c for a coolant provided at both ends of the resulting pipe, the pipe may have a zigzag shape in which the pipe is bent at a plurality of bent portions 451d which face the workpiece W.

The support box 452 may be configured such that it can energize the heating coil 451 when heating the workpiece W and support the heating coil 451 in a stable manner.

As shown in FIGS. 13A and 13B, the actuator 460 includes a vertical movement portion 462 which vertically moves the support box 452 and a horizontal movement portion 463 which horizontally moves the support box 452 along the radial direction from the rotation center of the workpiece W.

The vertical movement portion 462 includes a movement base 42 fixed to the heat treatment base 40, a lower base 464 disposed on the movement base 42, and a vertical drive mechanism 465 which vertically moves the lower base 464 relative to the movement base 42.

The vertical drive mechanism 465 includes a movement guide rod 466 and a vertical movement threaded shaft 467, which are vertically arranged and fixed to the lower base 464, a bearing 468 fixed to the movement base 42 to support the movement guide rod 466 in a vertically movable manner, a motor 469 (e.g., a servo motor) fixed to the movement base 42, and a connecting member 471 provided on the movement base 42 to vertically move the vertical movement threaded shaft 467 by the rotation of the motor 469.

The horizontal movement portion 463 includes first rails 472 arranged on the lower base 464 in a direction substantially perpendicular to the radial direction of the workpiece W, an upper base 473 movably arranged on the first rails 472, a first movement drive mechanism 474 which moves the upper base 47s along the first rails 472, and second rails 475 arranged on the upper base 473 along the radial direction of the workpiece W. The horizontal movement portion 463 further includes a second movement drive mechanism 476 which moves the support box 452, which is supported movably on the second rails 475, along the second rails 475.

Each of the first and second movement drive mechanisms 474, 476 includes a motor 477 (e.g., a servo motor), a rotatably driven horizontal movement threaded shaft 478 connected to the motor 477 and arranged along the first or second rails 472, 475, and a protrusion 479 provided on the upper base 473 or the support box 452 and screwed onto the horizontal movement threaded shaft 478. In a case in which the heating coil 451 can be positioned in advance with respect to the direction substantially perpendicular to the radial direction of the workpiece W, the first movement drive mechanism 474 may not be provided.

As shown in FIG. 11, the position detector 480 is disposed upstream of each of the heating positions P3. In this embodiment, one position detector 480 is disposed for each two heating positions P3 at a position corresponding to the upstream one of the radial bases 111 of the jig 100.

Figure 14:
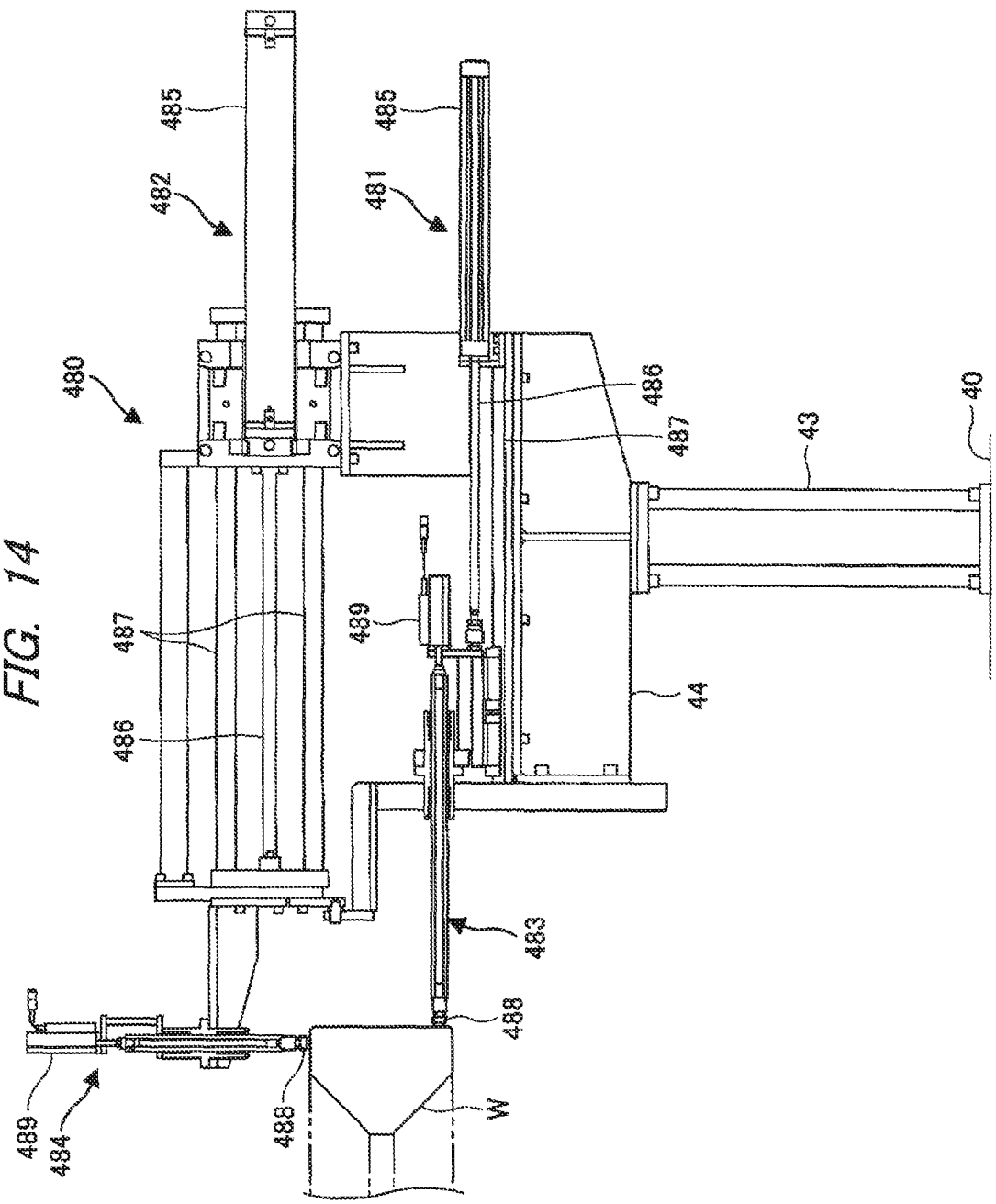
FIG. 14 is a partial side view of a position detector of the heating section.

As shown in FIG. 14, each of the position detectors 480 is mounted on a position detector base 44 provided on a position detector support 43 on the heat treatment base 40. Each of the position detectors 480 includes a radial position detecting device 483 mounted on the position detector support 43 via first linear movement mechanism 481, and an axial position detecting device 484 mounted thereon via a second linear movement mechanism 482. The radial position detecting device 483 and the axial position detecting device 484 are disposed perpendicularly to each other.

Each of the first and second linear movement mechanisms 482, 482 includes a linear drive device 485 (e.g., an air cylinder), and a plurality of guide rods 487 which are parallel to a rod of the linear drive device 485. The reciprocating mechanisms 481, 482 are prevented from falling along respective detecting directions of the position detecting devices 483, 484.

Each of the radial position detecting device 483 and the axial position detecting device 484 includes a heat resistant contact element 488 which is brought into abutment with the surface of the workpiece W so as to rotate, and a displacement detector 489 configured to detect a displacement of the contact element 488 while biasing the contact element 488 towards the workpiece W. For example, an air cylinder with a linear sensor can be used for each displacement detector 489.

The radial position detecting device 483 detects a change in the surface position of the workpiece W along the radial direction from the rotation center C of the workpiece W. The axial position detecting device 484 detects a change in the surface position of the workpiece W along an axial direction of the rotation center C of the workpiece W.

In this heating section 400, in order to dispose the workpiece W in the heating position P3, the jig 100 is disposed in position by the conveyor loader 220 shown in FIG. 2.

Figure 15A:
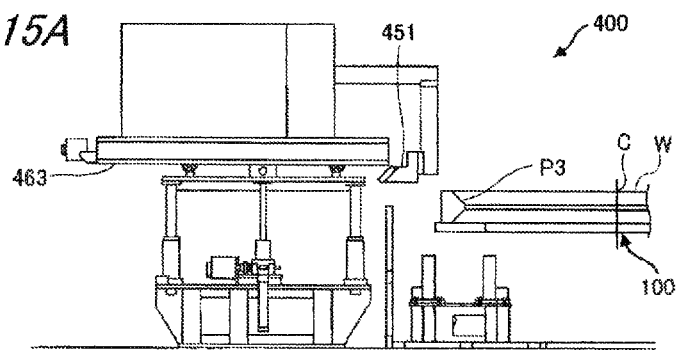
FIGS. 15A to 15C are explanatory views illustrating operations of the heating section and a cooling section of the heat treatment apparatus.

As shown in FIG. 15A, all the heating coils 451 are moved away from the rotation center C of the workpiece W by the horizontal movement portions 463, so as to form a space where the workpiece W is allowed to move down. At the same time, the holding rollers 425 shown in FIG. 12 and the position detecting devices 483, 483 are also moved away as far as possible from the rotation center C of the workpiece W. In this state, as shown in FIG. 9, the jig 100 is lowered by moving down the lifting base 240.

When the jig 100 is lowered, as shown in FIG. 12, in the circumferential positioning portion 411 of the jig holding mechanism 410, the cam follower 125 provided at the distal end of the radial base 111 is inserted into the guide groove 419a in the guide rail 419, whereby the jig 100 is positioned in the circumferential direction. In a state in which the jig stopper 413 of the heightwise positioning portion 412 is projecting, the bottom portion of the radial base 111 of the jig 100 at the distal end thereof is brought into abutment with the supporting end 418, whereby the workpiece W on the jig 100 is disposed in the predetermined position.

In the jig holding mechanism 410, the distal end positions of the plurality of radial bases 111 of the jig 100 are restricted in the circumferential direction and the height direction by the circumferential positioning portion 411 and the heightwise positioning portion 412, respectively. By doing this, the jig 100 can be disposed in a stable manner during heating, and the workpiece W can be rotated in a stable manner on the jig. Thus, even when a magnetic force is applied in the circumferential direction of the jig 100 during the induction heating of the workpiece W or when an inertial force is applied while the workpiece W is rotated or stopped, the position error of the jig 100 can be prevented.

In the heating section 400, the workpiece W on the jig 100 is heated as follows.

As shown in FIG. 15A, with the workpiece W on the jig 100 set in position in the heating section 400, the heating coil 451 of each of the heaters 450 is moved by the vertical movement portion 462 and the horizontal movement portion 463, so that the heating coil 451 is disposed to face the surface of the workpiece W in the respective heating positions P3.

In this state, the workpiece W is rotated along the ring shape of the workpiece W by the rotating rollers 112 of the jig 100. As shown in FIG. 12, in the workpiece holding unit 420, the holding roller 425 is advanced by the linear drive unit 424 and is lowered by the pushing drive unit 422. The holding roller 425 holds the uppermost surface or edge of the workpiece W and rotates so as to follow the surface of the workpiece W. The workpiece W rotates in a stable manner by being held by the holding roller 425 from above.

In each of the position detectors 480, as shown in FIG. 14, the respective contact elements 488 of the radial position detecting device 483 and the axial position detecting device 484 are brought into abutment with the workpiece W. When the workpiece W is rotated, each of the contact elements 488 that are in contact with the surface of the workpiece W rolls and also moves back and forth as the surface of the workpiece W is displaced. The displacement of the contact elements 488 is detected by the corresponding displacement detectors 489, whereby a vertical displacement and a horizontal displacement of the surface of the workpiece W are detected.

For example, by measuring a reciprocating amount of each contact element 488 from an arbitrary circumferential position of the workpiece W as a reference position, a displacement of the workpiece W from the reference position in the respective position in the circumferential direction of the workpiece W is detected. Since the workpiece W is the annular body, the workpiece returns to its originating position after having rotated one full rotation.

The displacements of the surface of the workpiece W which are measured by the respective position detecting devices 483, 484 of each position detector 480 are transmitted to a control unit, not shown. In the control unit, a timing and position where the respective portion on the surface of the workpiece W which has passed by the corresponding detection position will pass by the heater 450 which is situated directly downstream of the detecting position can be obtained with good accuracy based on the displacements of the workpiece W and the rotation speed of the rotary drive motor 255. Therefore, when the respective portion of the workpiece W passes by the heating position P3, by displacing the heating coil 451 so as to correspond to the position so obtained by the actuator 460, a constant space can be maintained between the heating coil 451 and the surface of the workpiece W in a stable manner at all times.

In this state, by energizing each of the heating coils 451 by the corresponding support box 452 for induction heating, the workpiece W is heated. By doing this, the entire circumference of the workpiece W can be heated uniformly with good accuracy.

Cooling Section

As shown in FIGS. 2, 12 and 13, the cooling section 500 includes the tub 510 provided below the heating section 400, a plurality of cooling jackets 520 (cooling units) disposed inside the tub 510, the plurality of guide rails 419 which are also used commonly by the heating section 400, and a plurality of abutment protrusions 525 supporting the bottom portions of the radial bases 111 of the jig 100.

The tub 510 is provided so as to surround the jig 100 and the workpiece W with a view to preventing the scattering of coolant. The plurality of cooling jackets 520 are disposed so as to face an inner circumferential side and an outer circumferential side of the workpiece W to thereby spray coolant to the workpiece W. The cooling jackets 520 are disposed in a plurality of circumferential positions of the workpiece W at substantially uniform intervals.

To cool the workpiece W in this cooling section 500, as shown in FIG. 12, the jig stoppers 413 of the heightwise positioning portions 412 in the heating section 400 are caused to swing downwards so as to be released from the supporting condition. As shown in FIG. 9, the jig 100 supporting the workpiece W is lowered by the conveyor loader 220. The jig 100 may not be moved up before being lowered. The jig 100 may be lowered while rotating the workpiece W on the jig 100.

When the lifting base 240 of the conveyor loader 220 is moved down, as shown in FIG. 12, the cam followers 125 of the jig 100 are lowered while being guided by the guide rails 419 to thereby be brought into abutment with the abutment protrusions 525, whereupon the jig 100 is stopped. The rotary drive device 246 and the connecting devices 132, 133 are disposed above the cooling section 500.

Figure 15B:
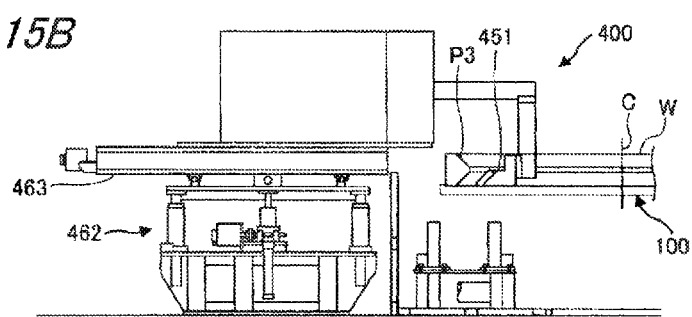
Figure 15C:
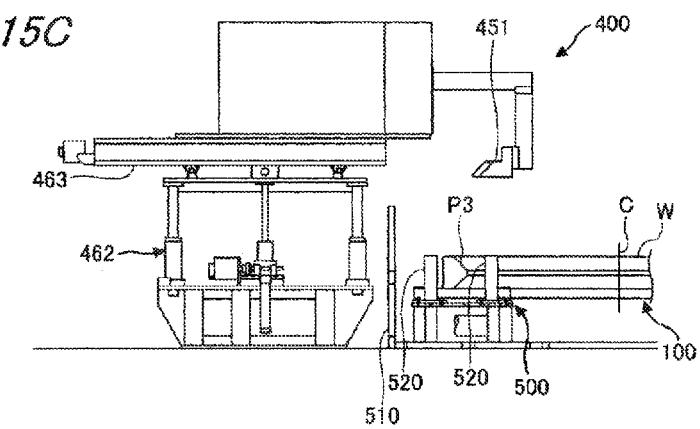

As shown in FIG. 15C, with the workpiece W disposed in a predetermined position in the cooling section 500, coolant is injected from the cooling jackets 520 while the workpiece W is being rotated, whereby the entire workpiece W can be cooled uniformly.

Component Replacing Section

The component replacing section 600 (a preparatory section) shown in FIGS. 1 and 2 is used when replacing one or more components of the heating section 400 and the cooling section 500. In this embodiment, an example will be described in which the heating coils 451 are changed in accordance with a workpiece to be treated.

As shown in FIGS. 1 and 2, the component replacing section 600 includes a component replacement base 50, component replacement rails 610 which are provided on the component replacement base 50, a component replacement carriage 615 which can move on the component replacement rails 610, and a component replacement jig 620 which is placed on the component replacement carriage 615.

The component replacement jig 620 is adapted to convey the heating coils 451 of the heating section 400 and includes a connecting protrusion 131 like the connecting protrusion 131 of the jig 100 and a plurality of support arms which are provided so as to extend in a radial direction from the connecting protrusion 131. The connecting protrusion 131 is provided so as to project upwards from the center of the plurality of support arms 621 and has locking holes 134 like the locking holes 134 provided in the jig 100. This configuration enables the component replacement jig 620 to be suspended by the suspending portion 245 of the conveyor mechanism 200.

The plurality of support arms 621 are provided to extend radially from the connecting protrusion 131 so as to be oriented to face the respective support boxes 452 of the plurality of heaters 450 of the heating section 400. Although not shown, holding portions to hold the heating coils 451 are provided at respective distal ends of the support arms 621.

The component replacement jig 620 is placed on the component replacement carriage 615 such that the support arms 621 of the component replacement jig 620 are oriented so as to coincide in position with the respective support boxes 452. In this state, the component replacement carriage 615 is adapted to move between a preparatory position P4 and a suspending position P5.

With the component replacement carriage 615 stopped in the suspending position P5, the connecting protrusion 131 of the component replacement jig 620 is disposed in a position where the connecting protrusion 131 is allowed to be connected by the lifting base 240 of the conveyor loader 220.

In order to change heating coils 451 in the component replacing section 600 that is configured in the way described above, the component replacement jig 620 is caused to hold the plurality of heating coils 451 in a predetermined orientation with the support arms 621 in the preparatory position P4. Then, the component replacement carriage 615 is moved to the suspending position P5. The conveyor loader 220 of the conveyor mechanism 200 is moved to a space above the component replacing section 600, and the lifting base 240 is moved down. As with the jig 100, the suspending protrusion 247 of the lifting base 240 is connected to the connecting protrusion 131.

In this state, the lifting base 240 is moved up. Thereafter, the conveyor loader 220 is moved to a space above the heating section 400. The lifting base 240 is moved down so that the heating coils 451 held by the component replacement jig 620 are disposed in positions situated in the vicinity of the corresponding support boxes 452. Then, the heating coils 451 are mounted in the corresponding support boxes 452.

Quenching Method

Next, a method will be described of quenching a workpiece W by use of the heat treatment apparatus 10.

A quenching method of this embodiment includes a preparatory step of setting the relevant units, devices and portions to match a workpiece W to be treated, a loading step of loading a workpiece W to place it on the jig 100, a conveying step of conveying the jig 100 on which the workpiece W is placed, a heating step of induction heating the workpiece W on the jig 100, a cooling step of cooling the workpiece W on the jig 100, and an unloading step of unloading the quenched workpiece W.

In the preparatory step, the relevant units, devices and portions are set to match the size and shape of the workpiece W to be treated. When mounting the components of the heaters 450 such as the heating coils 451 in the heaters 450, the component replacing section 600 and the component replacement jig 620 shown in FIGS. 1 and 2 are used.

In the component replacing section 600, the support arms 621 of the component replacement jig 620 are individually caused to hold the heating coils 451 on the component replacement carriage 615. As shown in FIG. 16C, the component replacement jig 620 is conveyed by the conveyor loader 220 of the conveyor mechanism 200. The heating coils 451 held by the component replacement jigs 620 are disposed in the positions which correspond to the respective support boxes 452 of the heaters 450. In this state, the heating coils 451 are mounted in the corresponding support boxes 452. Thereafter, the component replacement jig 620 is returned to the component replacing section 600 by operating the conveyor mechanism 200 in a reverse manner.

In the loading step, the workpiece W to be heated is loaded in the loading and unloading section 300 shown in FIGS. 1 and 2, and the workpiece W is placed on the jig 100 for conveyance.

In the loading and unloading position P1 in the loading and unloading section 300, with the jig 100 placed on the loading and unloading carriage 315, the workpiece W is placed on the jig 100. As shown in FIG. 3, the workpiece W is placed on the plurality of rotating rollers 112 of the jig 100 so as to surround the central structure unit 130 and with one end face thereof oriented downwards.

The loading and unloading carriage 315 is moved to the suspending position P2 and is then stopped there. Thus, the jig 100 on which the workpiece W is placed is disposed in the predetermined position.

In the conveying step, the jig 100 on which the workpiece W is placed is suspended by the conveyor loader 200 of the conveyor mechanism 200 so as to be conveyed from the loading and unloading section 300 to the heating section 400.

Figure 16A:
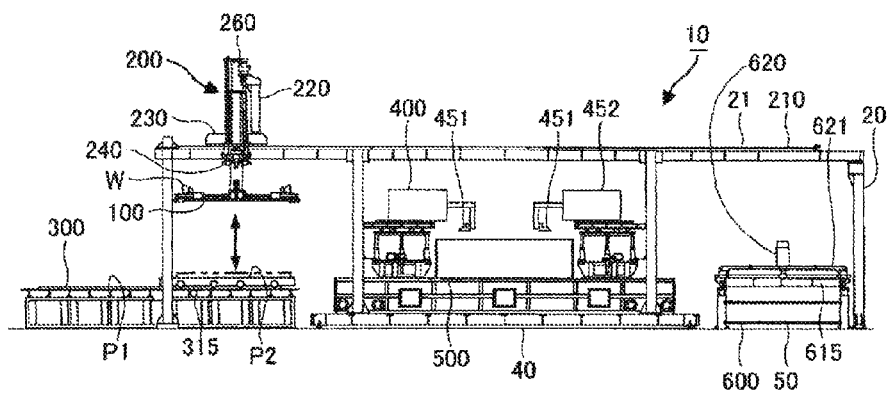
FIGS. 16A to 16C are explanatory views illustrating a quenching method in the heat treatment apparatus.

As shown in FIG. 16A, the lifting base 240 of the conveyor loader 220 of the conveyor mechanism 200 is moved down. Then, as shown in FIGS. 10A to 10C, the suspending portion 245 of the lifting base 240 is connected to the central structure unit 130 of the jig 100 disposed in the suspending position P2 in the loading and unloading section 300.

Figure 16B:
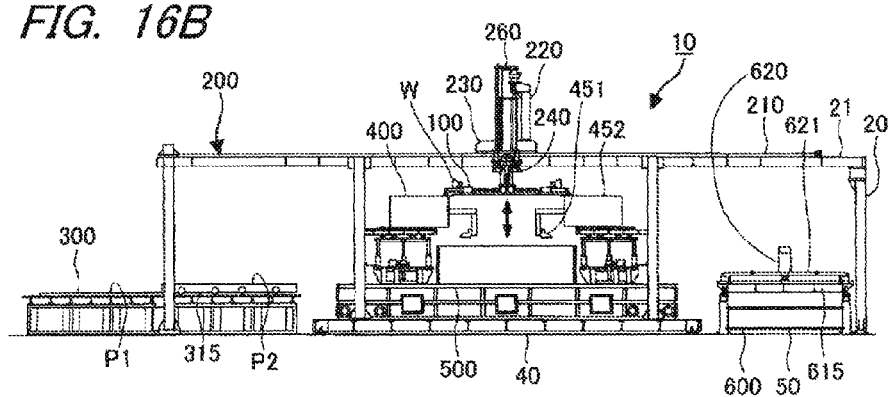
Figure 16C:
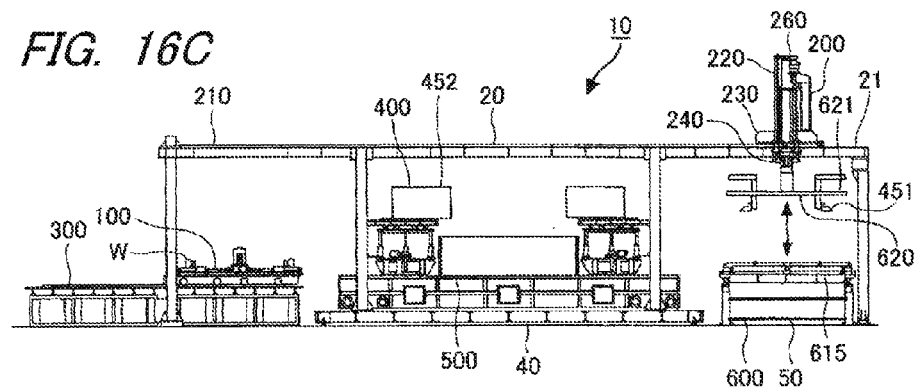

After moving up the lifting base 240 of the conveyor loader 220, the conveyor loader 220 is moved to the space above the heating section 400 as shown in FIG. 16B. Then, as shown in FIG. 15A, the jig 100 is lowered, so that the workpiece W placed on the jig 100 is disposed in the heating section 400.

In the heating step, the workpiece W placed on the jig 100 is induction heated in the heating section 400 shown in FIGS. 1 and 2.

As shown in FIG. 15B, the heating coils 451 are disposed to face the heating positions P3 on the surface of the workpiece W with the predetermined space defined therebetween by the actuators 460. With the jig 100 held by the jig holding mechanisms 410, the rotating rollers 112 are rotated by the rotary drive assembly 30 so as to rotate the workpiece W along the ring shape thereof. The peripheral speed of the workpiece W is maintained constant by the rotary drive assembly 300, and the space between the workpiece W and the heating coils 451 is maintained constant by the position detecting devices 483, 484 and the actuators 460. In this state, all the heating coils 451 are fed for a predetermined period of time from the corresponding support boxes 452 so as to heat uniformly the workpiece W along the entire circumference of the workpiece W.

In the cooling step, as shown in FIG. 15C, after the heating of the workpiece W is completed, the lifting base 240 of the conveyor loader 220 is moved down, so that the workpiece W placed on the jig 100 is disposed in the cooling section 500. Coolant is sprayed to the workpiece W from the cooling jackets 520 which are provided in the plurality of positions while rotating the workpiece W.

After the cooling is completed, the lifting base 240 is moved up as shown in FIG. 16B and is then moved to the suspending position P2 in the loading and unloading section 300 as shown in FIG. 16A. Then, the jig 100 is placed on the loading and unloading carriage 315 in the loading and unloading section 300 as indicated by an imaginary line. The loading and unloading carriage 315 on which the jig 100 is placed is then moved to the loading and unloading position P1 for conveyance to a posterior step. This ends the quenching process of the workpiece W.

Advantages

According to the heat treatment apparatus 10 described above, the workpiece W is placed on the plurality of rotating rollers 112 of the workpiece support 110 for rotation. Therefore, the workpiece W can be rotated without being clamped or fastened in place, so that there is a high flexibility with respect to the size and shape of the workpiece W. Thus, the size and shape of the workpieces W to be heated can be easily changed by selecting suitable heating coils 451, and even a large ring-shaped workpiece W can be heated. Thus, a range of use is broad.

When heating the workpiece W, it is not the position of the workpiece W but the positions of the heating coils 451 that are adjusted by the actuators 460. Therefore, the rotation center C of the ring-shaped workpiece W does not have to be positioned at the center of the workpiece W. That is, even when the rotation center C and the center of the workpiece W are not on the same point, the space between the workpiece W and the heating coils 451 can be maintained constant with good accuracy. Even when the workpiece W is heavy, the distance between the workpiece W and the heating coils 451 can easily be controlled with good accuracy by the simple configuration. When heating the workpiece W, unnecessary stress is not loaded on the workpiece W, and therefore, the deformation of the workpiece W can be prevented. Therefore, even a large workpiece W can be heated with good accuracy by the simple configuration.

Consequently, the heat treatment apparatus 10 has a wide range of use with a simple configuration, and can heat even a large workpiece W with good accuracy.

In the heat treatment apparatus 10, the heating position P3 is provided between adjacent ones of the rotating rollers 112. Therefore, the free open state can be realized between the rotating rollers 112 which lie adjacent to each other where other members do not come into contact with the entire circumference of the workpiece W which is at right angles to the rotating direction of the workpiece W. The heating position P3 is provided in this position, and therefore, any portion on the surface of the workpiece W can be heated. Consequently, by commonly using the structures such as the workpiece support 110 and the rotary drive assembly 30, a workpiece W of an arbitrary shape can be heated by selecting heating coils 451 of an appropriate shape to the workpiece W to be heated.

In this heat treatment apparatus 10, the position detector 480 is provided to detect the position of the surface of the workpiece W, and the the heating coil 451 is moved based on the results of the detection carried out by the position detector 480. Even when the workpiece W is rotating such that the center and the rotation center C of the workpiece W are not centered on the same point, the position of the surface of the workpiece W from the rotation center C which is detected by the position detector 480 situated upstream of the heating position P3 does not change even in the heating position P3. Thus, by adjusting the position of the heating coil 451 based on the detection value of the position detector 480, the heating coil 451 can be disposed accurately relative to the position of the surface of the workpiece W so as to heat the workpiece W.

This heat treatment apparatus 10 has the plurality of heaters 450 and the plurality of actuators 460. In addition, the position detector 480 is provided for each heater 450 and actuator 460. Therefore, the workpiece W can be heated accurately in the plurality of positions. Thus, even a large workpiece W can be heated uniformly.

In the heat treatment apparatus 10, the rotary drive assembly 30 includes the rotary drive device 246 and the rotary drive mechanism 150 as the transmission unit. The rotary drive mechanism 150 has the drive gear 154 which is driven to rotate by the rotary drive device 246 and the plurality of driven gears 155 which mesh with the drive gear 154 so as to be connected to the plurality of rotating rollers 112.

Therefore, the plurality of rotating rollers 112 can be rotated uniformly by means of the rotation of the rotary drive device 246 in the simple configuration. Consequently, the rotation speed of the workpiece W can be controlled stably and accurately.

This heat treatment apparatus 10 includes the cooling jackets 520 as the cooling units for cooling the workpiece W which is heated in the heating section 450, and the rotary drive device 246 is disposed above the workpiece W. Therefore, when cooling the workpiece W, the coolant is prevented from being brought into contact with the rotary drive device 246, thereby making it possible to simplify the configuration of the waterproofing construction remarkably.

According to the jig 100 of the heat treatment apparatus 10, the workpiece W can be suspended via the conveyor connecting portion 132 in a state in which the workpiece W is supported on the workpiece support 110, and the driving force can be input to the rotary drive mechanism 150 (the transmission unit) via the driver connecting portion 133 to rotate the workpiece W placed on the workpiece support 110 the ring shape of the workpiece W. Therefore, the workpiece W can be supported using the same jig 100 from the conveying of the workpiece W to the heating of the workpiece W. Thus, when heating the workpiece W after being conveyed, it is not necessary to transfer or to position the workpiece W.

The conveyor connecting portion 132 and the driver connecting portion 133 are provided in the central structure unit 130. Therefore, with the central structure unit 130 connected to the suspending portion 245 and the rotary drive device 246, the workpiece W can be conveyed while being suspended. Additionally, the workpiece W can be heated while being rotated. Consequently, there is no need to provide separately a structure for supporting the workpiece W when it is conveyed and a structure for supporting the workpiece W when it is heated. The workpiece W can be connected to both the devices 132, 133 only by the workpiece W being connected to the central structure unit 130. This can provide the simple configuration.

Moreover, the workpiece W can be placed on the rotating rollers 12 of the workpiece support 110, and the workpiece W can be rotated by the rotating rollers 12 while being supported on the jig 100 without being fastened. Therefore, there is less limitation and high flexibility with respect to the size and shape of the workpiece W. That is, the jig 100 can commonly be used for workpieces W having different shapes, and its range of use is wide. Consequently, the jig 100 has broad range of use, and can support the workpiece with a simple configuration without transferring the workpiece W when conveying and heating the workpiece W.

In this jig 100, the connecting position of the driver connecting portion 133 is disposed above the workpiece W which is supported on the workpiece support 110. Therefore, when cooling the workpiece W, the coolant can be prevented from coming into contact with the rotary drive device 246.

In the jig 100, the rotary drive mechanism 150 includes the drive shaft 152 and the plurality of driven shafts 153 which are connected individually to the plurality of rotating rollers 112. In addition, the drive gear 154 on the drive shaft 152 meshes with the respective driven gears 155 on the plurality of driven shafts 153. Therefore, the plurality of driven shafts 153 can individually be driven to rotate by rotating the drive shaft 152 with the driving force input from the driver connecting portion 133. Consequently, the rotation speed of the plurality of rotating rollers 112 can be controlled by controlling the driving force, thereby making it possible to control the rotating speed of the workpiece W easily and stably.

In this jig 100, the workpiece support 110 includes the workpiece positioning roller 121 which positions the inner circumference or the outer circumference of the workpiece W. Therefore, with the workpiece positioning roller 121 disposed within the range which permits the position error of the workpiece W, the workpiece W can be prevented from being placed on the jig 100 with the center of gravity of the workpiece W deviating largely, whereby the workpiece W can be conveyed with good balance. In addition, the workpiece W can be prevented from being placed on the jig 100 while deviating extremely from a track formed by the plurality of rotating rollers 112. Thus, the workpiece W can be rotated along the ring shape thereof in an ensured manner when it is heated.

According to the heat treatment apparatus 10 having the jig 100, the workpiece W can be conveyed between the loading and unloading section 300 and the heating section 400 so as to be heated in the heating section 400 with the workpiece W placed on the same jig 100. Therefore, as long as a workpiece can be placed and rotated on the jig 100, once the workpiece W is placed and positioned on the jig 100 in the loading and unloading section 300, the workpiece W can be conveyed and heated in that position.

In this way, the jig 100 can commonly be used for workpieces having different shapes, thereby providing wide range of use. Further, the workpiece W can remain on the same jig 100 without being transferred onto a different jig in the loading and unloading section 300 and in the heating section 400, whereby the conveyance and heating of the workpiece W can easily be implemented. Thus, the jig 100 and the conveyor mechanism 200 can commonly be used, which simplifies the configuration of the heat treatment apparatus 10.

Consequently, the heat treatment apparatus 10 a wide range of use, and can facilitate the conveyance and heating of the workpiece W with a simple configuration.

In this heat treatment apparatus 10, provided on the lifting base 240 are the suspending portion 245 which is connected to the conveyor connecting portion 132 and the rotary drive device 246 which is connected to the driver connecting portion 133. The rotary drive device 246 and the driver connecting portion 133 can be connected together by connecting the suspending portion 245 to the conveyor connecting portion 132. Therefore, the plurality of connecting devices can be integrated into one unit, whereby the plurality of connecting operations involved in the conveyance and heating of the workpiece W can be performed all together at one time. Consequently, the configuration and operation of the heat treatment apparatus 10 can be simplified further.

The rotary drive device 246 and the driver connecting portion 133 can be attached to and detached from each other in the vertical direction, and the suspending portion 245 and the conveying connecting device 132 can be attached to and detached from each other in the horizontal direction. Thus, by positioning the lifting base 240 relative to the jig 100 and lowering the lifting base 240, the rotary drive device 246 and the driver connecting portion 133 can be connected together. The suspending portion 245 and the conveyor connecting portion 132, on which the load of the workpiece W acts, are connected together in the horizontal direction. Therefore, even when the load of the workpiece W is large, sufficient connecting strength can be ensured. The connecting direction of the rotary drive device 246 and the driver connecting portion 133 is different from the suspending portion 245 and the conveyor connecting portion 132. Therefore, as long as the suspending portion 245 and the conveyor connecting portion 132 are connected together, the rotary drive device 246 and the driver connecting portion 133 can be maintained connected. Thus, a mechanism for maintaining the rotary drive device 246 in the connected state is unnecessary. Consequently, the connecting construction of the respective devices can be simplified.

In this heat treatment apparatus 10, the connecting protrusion 131 is provided concentrically with the drive shaft 152. Therefore, when the connecting protrusion 131 is connected to the suspending portion 245 with the drive shaft 152 connected to the rotary drive device 246, the workpiece W placed on the workpiece support 110 can be suspended by the suspending portion 245 with good balance such that the rotating rollers 112 can be rotated by the rotary drive device 246.

In this heat treatment apparatus 10, the dog clutch mechanism 140 provided on the drive shaft 152 and capable of being locked in the vertical direction is provided by lowering the output shaft 256 of the rotary drive motor 255. That is, locking is achieved only by lowering the output shaft 256, thereby making it possible to simplify the operation.

In the heat treatment apparatus 10, the conveyor connecting portion 132 has the locking holes 134 which are larger than the locking pins 251 in the positions on the central structure unit 130 which correspond to the locking pins 251. The locking hole 134 has the substantially triangular shape which is wider than the locking pin 251. Therefore, when the locking pins 251 are raised relative to the locking holes 134 by suspending the central structure unit 130 by the suspending portion 245, the locking holes 134 in the central structure unit 130 are guided by the locking pins 251, whereby the central structure unit 130 is centered. Thus, the jig 100 can easily be suspended while being centered. Consequently, the jig 100 on which the workpiece W is supported can be conveyed in a stable manner.

The conveyor mechanism 200 includes the biasing device 262 that upwardly biases the lifting base 240, on the lateral movement base 230, and in addition to the lifter 261 that moves the lifting base 240 up and down. Therefore, when lifting the workpiece W, the lifting base 240 is biased upwards by the biasing device 262. Thus, even when the weight of the workpiece W is large, a driving force of the lifter 261 required to lift the lifting base 240 can be reduced. On the other hand, when lowering the workpiece W, the lifting base 240 loading the weight of the workpiece W is lowered. Therefore, a driving force of the lifter 261 required to lower the lifting base 240 may be small. As a result, even when the weight of the workpiece W is large, the driving force required by the lifter 261 can be reduced, thereby making it possible to reduce the size of the lifter 261.

In this heat treatment apparatus 10, the cooling section 500 is provided below the heating section 400. Then, by lowering the jig 100, the workpiece W placed on the jig 100 can be disposed in the cooling section 500 to be cooled. Therefore, when the jig 100 is lowered without being moved in the horizontal direction, the workpiece W can easily be disposed in the cooling section 500, thereby making it possible to start the cooling of the workpiece W within a short period of time after the completion of heating thereof. Moreover, with the cooling section 500 disposed below the heating section 400, the coolant is made difficult to be brought into contact with the heaters 450, and this can simplify or omit a waterproofing construction.

The cooling section 500 provided below the heating section 400, and during the heating, the jig 100 is supported f by the jig stoppers 413 from below. Therefore, the jig 100 is positioned in a stable manner, and accurate heating can be carried out. Further, the jig stoppers 413 of the heating section 400 can be released downwards. Therefore, when moving the jig 100 to the cooling section 500 after the heating, the jig 100 can be released easily and quickly, so that the cooling of the heated workpiece W can be started in a short time.

In this heat treatment apparatus 10, the rotary drive device 246 is provided on the lifting base 240. Therefore, the rotary drive device 246 can be disposed above the workpiece W in the cooling section 500. Thus, the coolant is made difficult to be brought into contact with the rotary drive device 246, and this can simplify or omit a waterproofing construction.

In the heat treatment apparatus 10, the heating section 400 includes the circumferential positioning portion 411 which positions the jig 100 with respect to the circumferential direction. Therefore, the jig 100 which is conveyed to the heating section 400 by the conveyor mechanism 200 can be positioned in the horizontal direction by the circumferential positioning portion 411. In addition to this, when induction heating the workpiece W, not only can the jig 100 be prevented from moving by means of magnetic force, but also the jig 100 can be prevented from moving by means of a reaction force generated when the rotation of the workpiece W is changed.

In this heat treatment apparatus 10, the plurality of heaters 450 are disposed at substantially equal intervals in the circumferential direction in the heating section 400. Therefore, the workpiece W is heated by the plurality of heaters 450 while being rotated. Thus, even a large workpiece W can be heated uniformly along the entire circumference of the workpiece W.

In the heat treatment apparatus 10, the heating coils 451 or other components of the heaters 450 can be held on the component replacement jig 620 disposed in the component replacing section 600 in the positions corresponding to the heaters 450 which are disposed in the heating section 400. In addition, the component replacement jig 620 can be connected to the suspending portion 245 of the conveyor mechanism 200. Therefore, a preparatory operation for a different type of workpiece W can be facilitated.

Modifications

While the present invention has been described with reference to a certain embodiment thereof, the scope of the present invention is not limited to the embodiment described above, and it will be understood by those skilled in the art that various changes and modifications may be made therein. For example, in the embodiment, the heat treatment apparatus is described in which the workpiece W is quenched by being heated first and then being cooled. However, the invention can also be applied to a different heat treatment apparatus in which no cooling is implemented.

The workpiece W to be heated is not limited to the workpiece W having the circular ring shape with the circular cross section. Therefore, the invention can also be applied to a workpiece having a ring shape with a different cross section such as an elliptic cross section.

The embodiment has been described by taking as an example the one-time quenching in which the heating coils 451 are disposed in the plurality of positions along the circumference of the workpiece W to heat the workpiece W at one time. However, the present invention can also be applied similarly to a so-called moving quenching in which a heating coil 451 is disposed in a single position along the circumference of a workpiece W to heat the workpiece W. In this case, in a heating section 400, a heating coil 451 and an actuator 460 are disposed in a single heating position for operation.

In the embodiment, only the surface of the workpiece W is described as being quenched. However, for example, the workpiece W may be heated to a deep portion therein by disposing heating coils so as to face an inner surface and an outer surface of the workpiece W in positions which correspond to each other across the workpiece W for heating the workpiece W. In this case, heating coils disposed on an inner surface side and heating coils disposed on an outer surface side may be of the same type or a different type. In addition, the heating coil on the inner surface side and the heating coil on the outer surface side may be controlled in position by a single actuator 460.

In the embodiment shown in the drawings, the workpiece support 110 has the plurality of radial bases 111 which extend radially from the central structure unit 130. However, the workpiece support 110 does not have to have the plurality of radial bases 111. For example, the workpiece support 110 can be configured as a plate-shaped member having a circular or polygonal shape in a plan view or as a frame in which a plurality of materials are combined together two-dimensionally or three-dimensionally. The workpiece support 110 is configured so that the workpiece W is placed flat thereon with the end face oriented downwards. However, the construction of the workpiece support 110 is not specifically limited thereto, provided that the workpiece support 110 can rotate along the ring shape while supporting the workpiece W thereon. For example, the workpiece support 110 may be configured so as to rotate along the ring shape with the workpiece W placed inclined obliquely or erected thereon.

The rotary drive assembly 30 is configured so as to drive to rotate all the plurality of rotating rollers 112 which are provided on the jib 100 via the rotary drive mechanism 150. However, as long as the workpiece W can be driven to rotate, a configuration may be adopted in which only part of the plurality of rotating rollers 112 are driven to rotate.

In the embodiment above, the positions of the two heating coils 451 disposed downstream of the position detector 480 are adjusted in accordance with the displacement of the surface of the workpiece W detected by the position detector 480. However, the number of heating coils 451 to be controlled in position and the position of the position detector 480 relative to the heating coils 451 can be changed as required.

In the embodiment, the outer ring of the bearing is described as being heated as the workpiece W. However, an inner ring of the bearing can also be heated. In this case, a heating coil 451 may be shaped to match an outer circumferential surface of a workpiece W so as to face the workpiece W from an outside thereof.

Further, the workpiece W is not limited to the bearing. Therefore, the invention can be applied similarly to a ring-shaped workpiece which is used for a different purpose. In addition, the portion to be heated or heat treated is not limited to the inner circumferential surface or the outer circumferential surface of the workpiece W. For example, when heating a lateral side surface of the workpiece W, it is possible to use as the heating coil 451 a heating coil 451 which has a shape matching the shape of a circumferentially continuous lateral side surface. In this case, as the heating coil 451, a heating coil 451 may be used in which a portion facing the workpiece W is an angular pipe formed into a zigzag shape by bending the angular pipe at a plurality of bend portions 451f on an inside and an outside of the angular pipe and at bent portions 451g provided between the bent portions 451f. In this heating coil 451, a circumferential length of a portion situated far away from the rotation center C may be made longer than a circumferential length of a portion situated near the rotation center C.

In the embodiment, the rotation speed of the rotary drive motor 255 and the detection values of the position detecting devices 483, 484 are used to maintain the space between the heating coils 451 and the workpiece W constant. However, as indicated by an imaginary line in FIG. 12, a speed detector 427 is provided on part of the workpiece holding units 420 for detecting the rotation of the holding roller 425 to thereby measure a peripheral speed of the surface of the workpiece. Thus, the detection value of the speed detector 427 may be used in place of the rotation speed of the rotary drive motor 255.

In this way, even when a slippage is generated between the rotating rollers 112 and the workpiece W to thereby generate a deviation between the speed of the rotary drive assembly 30 and the actual rotating speed of the workpiece W, the space between the heating coils 451 and the workpiece W can be maintained constant with good accuracy.

In this embodiment, in the heating section 400, the heating coil 451 is caused to follow the displacement of the workpiece W in each heating position P3 based on the displacement and the rotating speed of the workpiece W measured by the respective position detecting devices 483, 484, so that the heating coil 451 and the workpiece W are disposed in the predetermined relative position. However, the heating coil 451 and the workpiece W can be disposed in the predetermined relative position by another method. For example, a displacement of the workpiece W is measured in advance prior to the start of heating so as to obtain a position of the center of the workpiece W. Then, each of the heating coils 451 is moved in advance with respect to the position of the center of the workpiece W. Thus, the workpiece W in the heating section 400 is disposed in the predetermined relative position. Then, in this state, the heating coil 451 is energized, so that the workpiece W can be heat treated without displacing the heating coil 451 during heating.

What is claimed is:

1. A heating method comprising:
placing a ring-shaped workpiece on a plurality of rotating rollers arranged in a circumferential direction;
setting the workpiece at a heating position to face a heating coil;
detecting a position of a surface of the workpiece at a location upstream of the heating position in a rotating direction of the workpiece;
moving the heating coil to adjust a position of the heating coil relative to the workpiece based on the detected position of the surface of the workpiece;
rotating the rotating rollers to rotate the workpiece along a ring shape of the workpiece; and
induction-heating the workpiece.

2. A heating method comprising:
placing a ring-shaped workpiece on a plurality of rotating rollers arranged in a circumferential direction, wherein the rotating rollers are connected to a central structure unit and arranged in the circumferential direction around the central structure unit, and the ring-shaped workpiece is placed on the rotating rollers such that the ring-shaped workpiece surrounds the central structure unit;
after the placing is carried out in a loading section, conveying the ring-shaped workpiece together with the rotating rollers from the loading section to a heating section, in which a heating coil is provided, such that the central structure unit is suspended;
setting the ring-shaped workpiece at a heating position to face the heating coil;
moving the heating coil to adjust a position of the heating coil relative to the ring-shaped workpiece;
rotating the rotating rollers to rotate the ring-shaped workpiece along a ring shape of the ring-shaped workpiece; and
induction-heating the ring-shaped workpiece.

* * * * *